(12) United States Patent
Kim et al.

(10) Patent No.: US 10,736,012 B2
(45) Date of Patent: Aug. 4, 2020

(54) METHOD AND DEVICE FOR PROVIDING CIRCUIT SWITCHING SERVICE IN WIRELESS COMMUNICATION SYSTEM

(71) Applicant: SAMSUNG ELECTRONICS CO., LTD., Suwon-si (KR)

(72) Inventors: Sunghoon Kim, Suwon-si (KR); Sung Hwan Won, Seoul (KR); Hwajin Cha, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/091,831

(22) PCT Filed: Apr. 7, 2017

(86) PCT No.: PCT/KR2017/003838
§ 371 (c)(1),
(2) Date: Oct. 5, 2018

(87) PCT Pub. No.: WO2017/176094
PCT Pub. Date: Oct. 12, 2017

(65) Prior Publication Data
US 2019/0132782 A1 May 2, 2019

(30) Foreign Application Priority Data
Apr. 8, 2016 (KR) .................. 10-2016-0043679

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0022* (2013.01); *H04W 36/08* (2013.01); *H04W 76/10* (2018.02); *H04W 76/19* (2018.02)

(58) Field of Classification Search
None
See application file for complete search history.

(56) References Cited

U.S. PATENT DOCUMENTS 8,615,241 B2 * 12/2013 Gupta ............... H04W 36/0011
455/437
10,015,807 B2 * 7/2018 Heo ....................... H04W 48/06
(Continued)

FOREIGN PATENT DOCUMENTS

KR    10-2013-0089659 A    8/2013
KR    10-2013-0111476 A    10/2013
(Continued)

OTHER PUBLICATIONS

Communication dated Dec. 11, 2018, issued by the European Patent Office in counterpart European Application No. 17779394.0.
(Continued)

*Primary Examiner* — Bunjob Jaroenchonwanit
(74) *Attorney, Agent, or Firm* — Sughrue Mion, PLLC

(57) ABSTRACT

Disclosed are a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail business, security and safety related services, and the like) on the basis of 5G communication technology and IoT related technologies. The present disclosure relates to a method by which a terminal receives a circuit switching (CS) service, and according to the present disclosure, the method by which a terminal receives a CS service, comprises the steps of: transmitting a CS fallback (CSFB) request to a mobility management entity (MME) through a first base station in order to use the CS service; detecting the failure of a radio resource connection to the
(Continued)

first base station; and transmitting, to a second base station, a radio resource re-establishment related message including a CSFB indicator for identifying the CSFB request.

15 Claims, 22 Drawing Sheets

(51) Int. Cl.
*H04W 76/10* (2018.01)
*H04W 36/08* (2009.01)
*H04W 76/19* (2018.01)

(56) References Cited

U.S. PATENT DOCUMENTS

| | | |
|---|---|---|
| 2011/0216645 A1 | 9/2011 | Song et al. |
| 2011/0235580 A1* | 9/2011 | Kanauchi ............. H04J 11/0069 370/328 |
| 2011/0250925 A1* | 10/2011 | Han ................. H04W 36/0079 455/524 |
| 2012/0120789 A1 | 5/2012 | Ramachandran et al. |
| 2012/0250498 A1* | 10/2012 | Johansson ........... H04L 41/0604 370/221 |
| 2013/0136115 A1 | 5/2013 | Moisanen et al. |
| 2013/0258888 A1 | 10/2013 | Jeong et al. |
| 2014/0051443 A1* | 2/2014 | Diachina ........... H04W 36/0022 455/436 |
| 2014/0179325 A1 | 6/2014 | Xu et al. |
| 2015/0071249 A1* | 3/2015 | Hu .................... H04W 36/0022 370/331 |
| 2015/0098448 A1 | 4/2015 | Xu et al. |
| 2015/0099509 A1 | 4/2015 | Mahmood et al. |
| 2015/0133122 A1* | 5/2015 | Chen .................... H04W 36/04 455/436 |
| 2015/0245407 A1* | 8/2015 | Johansson ............. H04W 76/18 370/329 |
| 2016/0255544 A1* | 9/2016 | Watfa ................ H04W 36/0022 370/331 |
| 2016/0269942 A1* | 9/2016 | Olsson ................... H04W 36/14 |
| 2017/0055197 A1* | 2/2017 | Shukair ............... H04W 36/165 |
| 2018/0132147 A1* | 5/2018 | Sharma ................. H04W 36/08 |
| 2019/0082363 A1* | 3/2019 | Park ...................... H04W 80/02 |
| 2019/0098544 A1* | 3/2019 | Han ...................... H04W 36/00 |
| 2019/0159099 A1* | 5/2019 | Xu .................... H04W 36/0066 |
| 2019/0342928 A1* | 11/2019 | Kawaguchi ........... H04W 24/02 |

FOREIGN PATENT DOCUMENTS

| | | |
|---|---|---|
| KR | 10-2016-0012234 A | 2/2016 |
| WO | 2013/080098 A1 | 6/2013 |
| WO | 2013/168937 A1 | 11/2013 |
| WO | 2014/117390 A1 | 8/2014 |

OTHER PUBLICATIONS

Anonymous, "Increased CSFB setup delay problem in case of context fetch", Partnership project (3GPP), TSG-RAN WG-3 Meeting #91bis, Apr. 1, 2016, (2 pages total).

Anonymous, "Abnormal cases for CSFB (LTE)", 3GPP Draft, 3rd Generation Partnership Project (3GPP), 3 GPP TSG CT WG1 Meeting # 58, Apr. 27, 2009 (3 pages total).

Search Report dated Jul. 17, 2017, issued by the International Searching Authority in counterpart International Patent Application No. PCT/KR2017/003838 (PCT/ISA/210).

Written Opinion dated Jul. 17, 2017, issued by the International Searching Authority in counterpart International Patent Application No. PCT/KR2017/003838 (PCT/ISA/237).

* cited by examiner

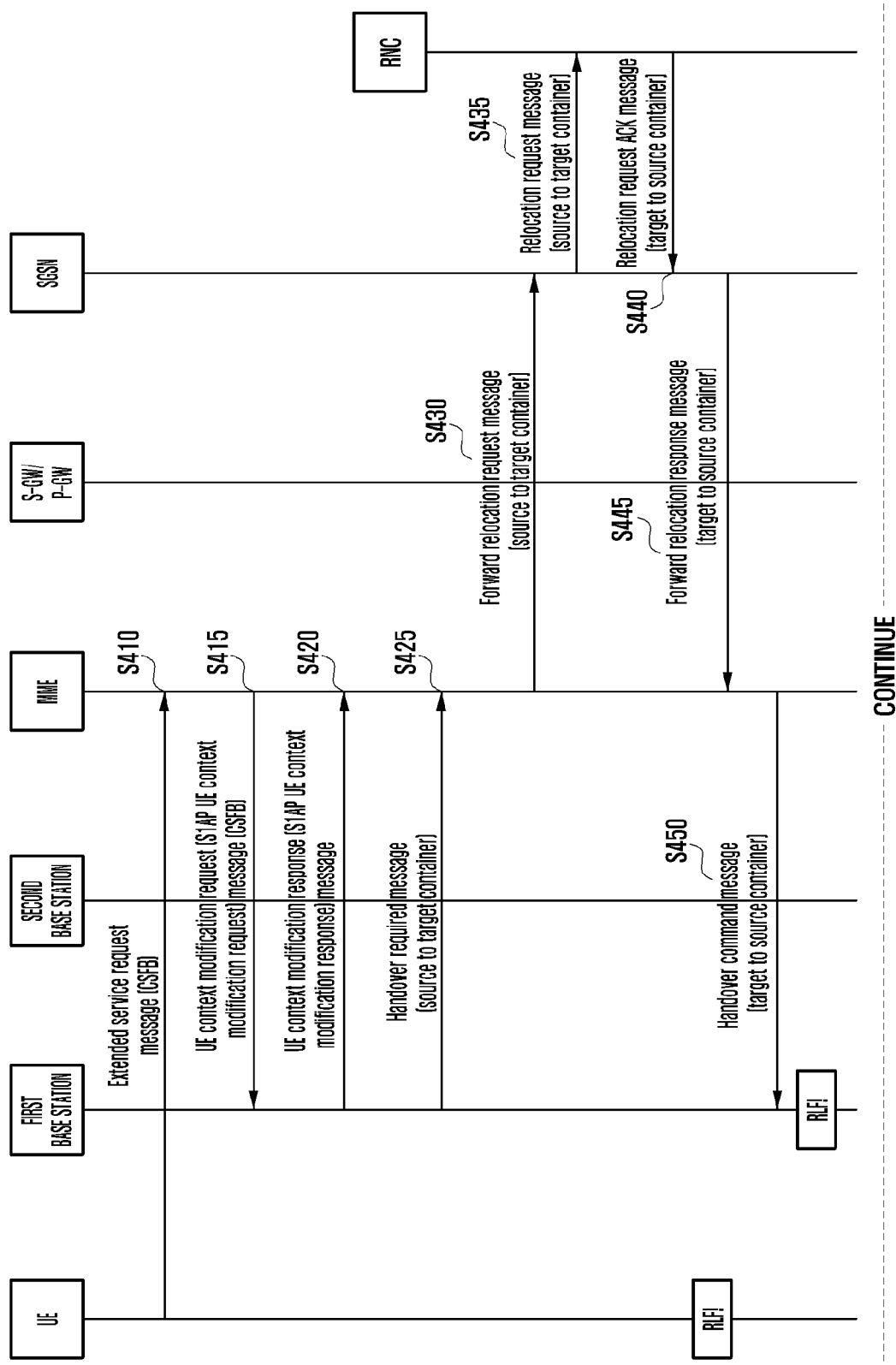

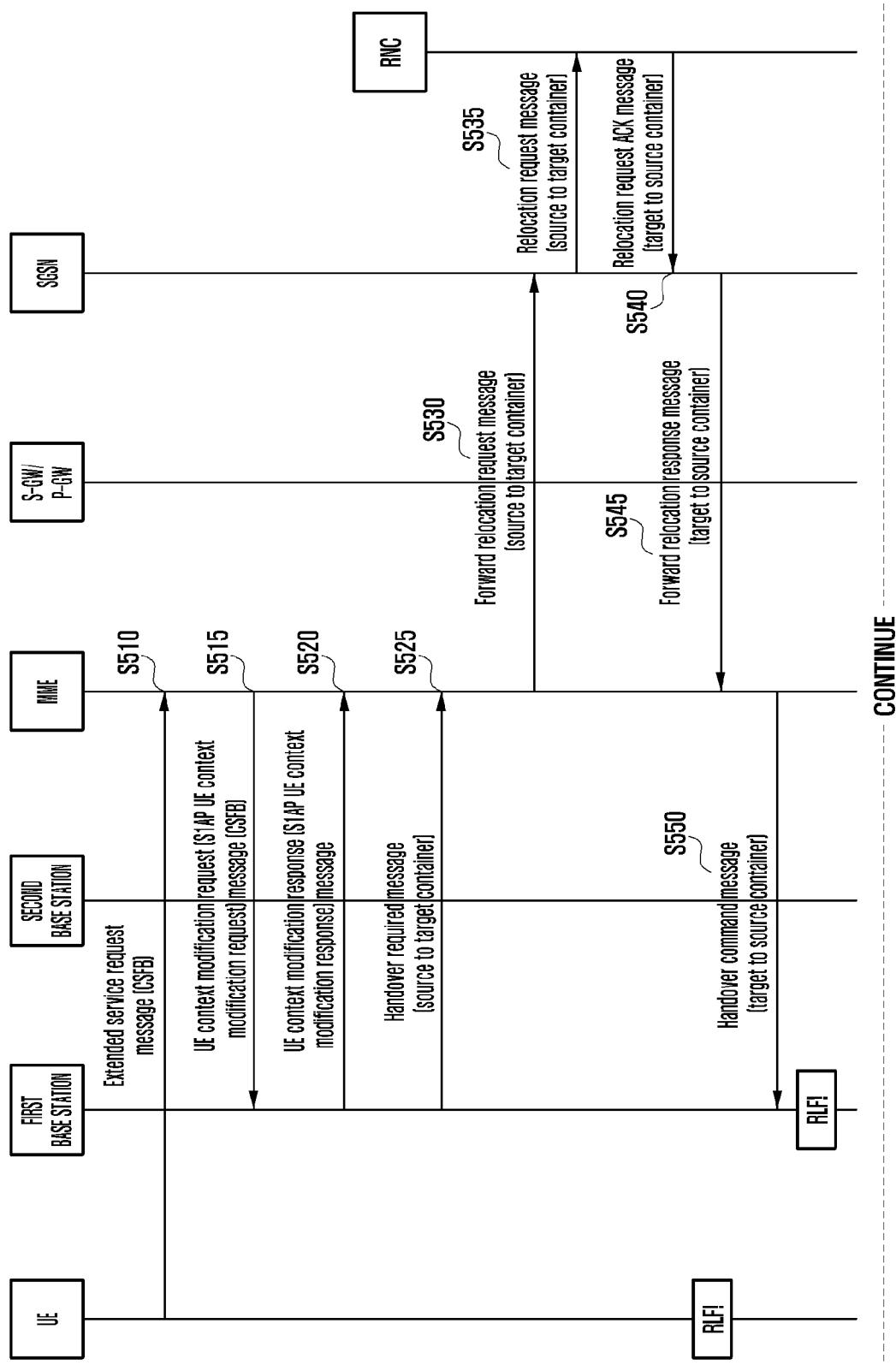

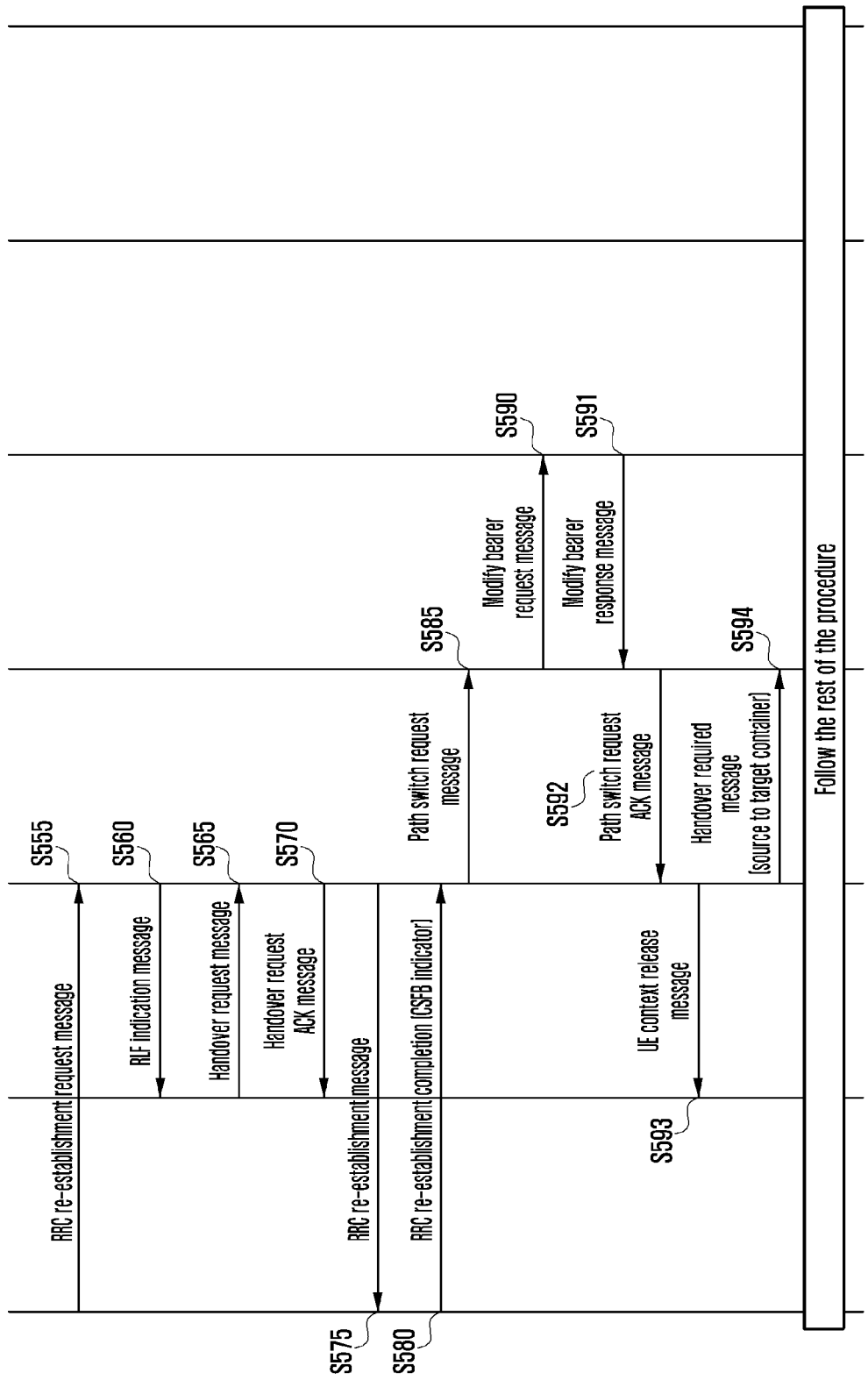

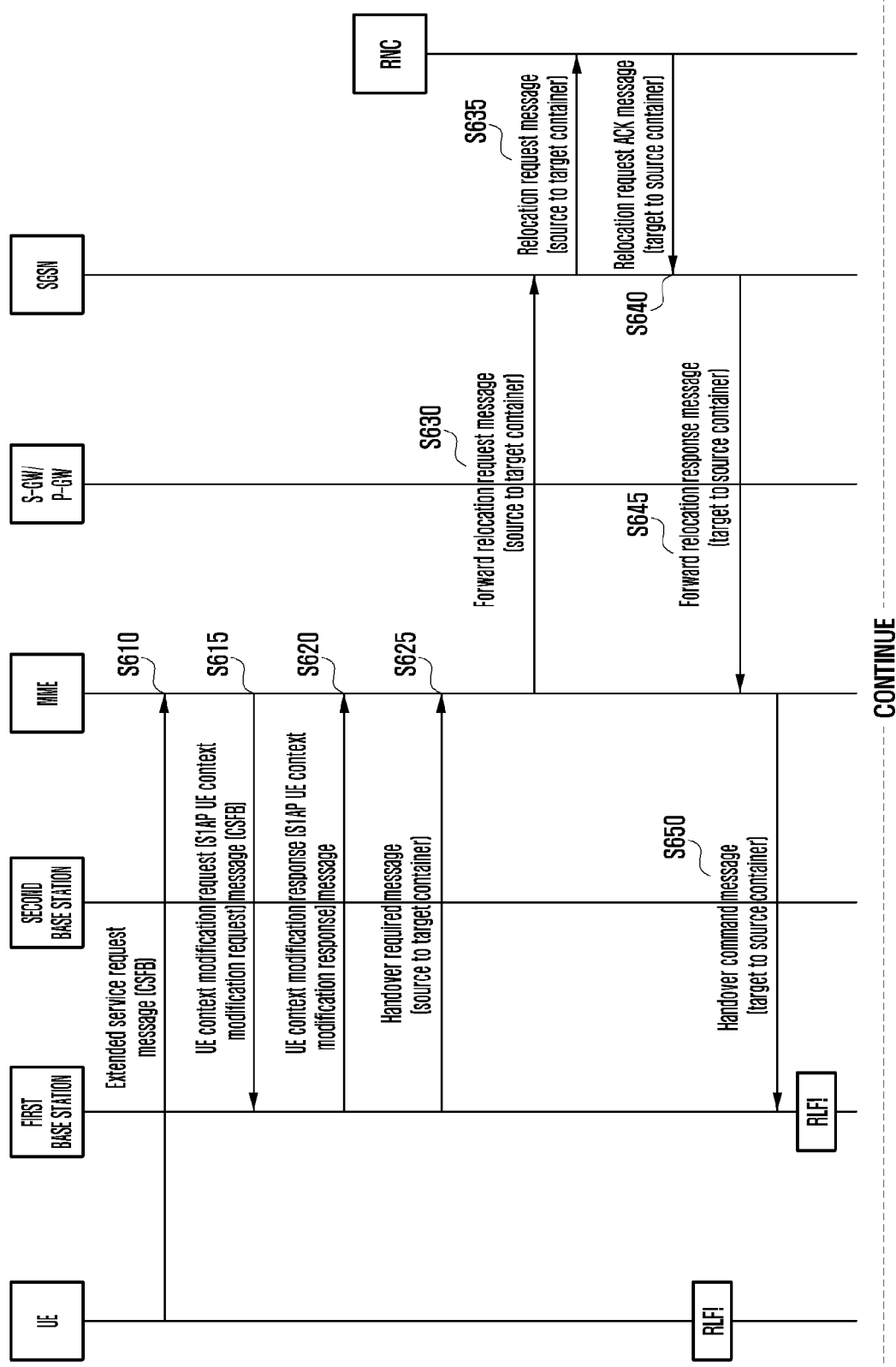

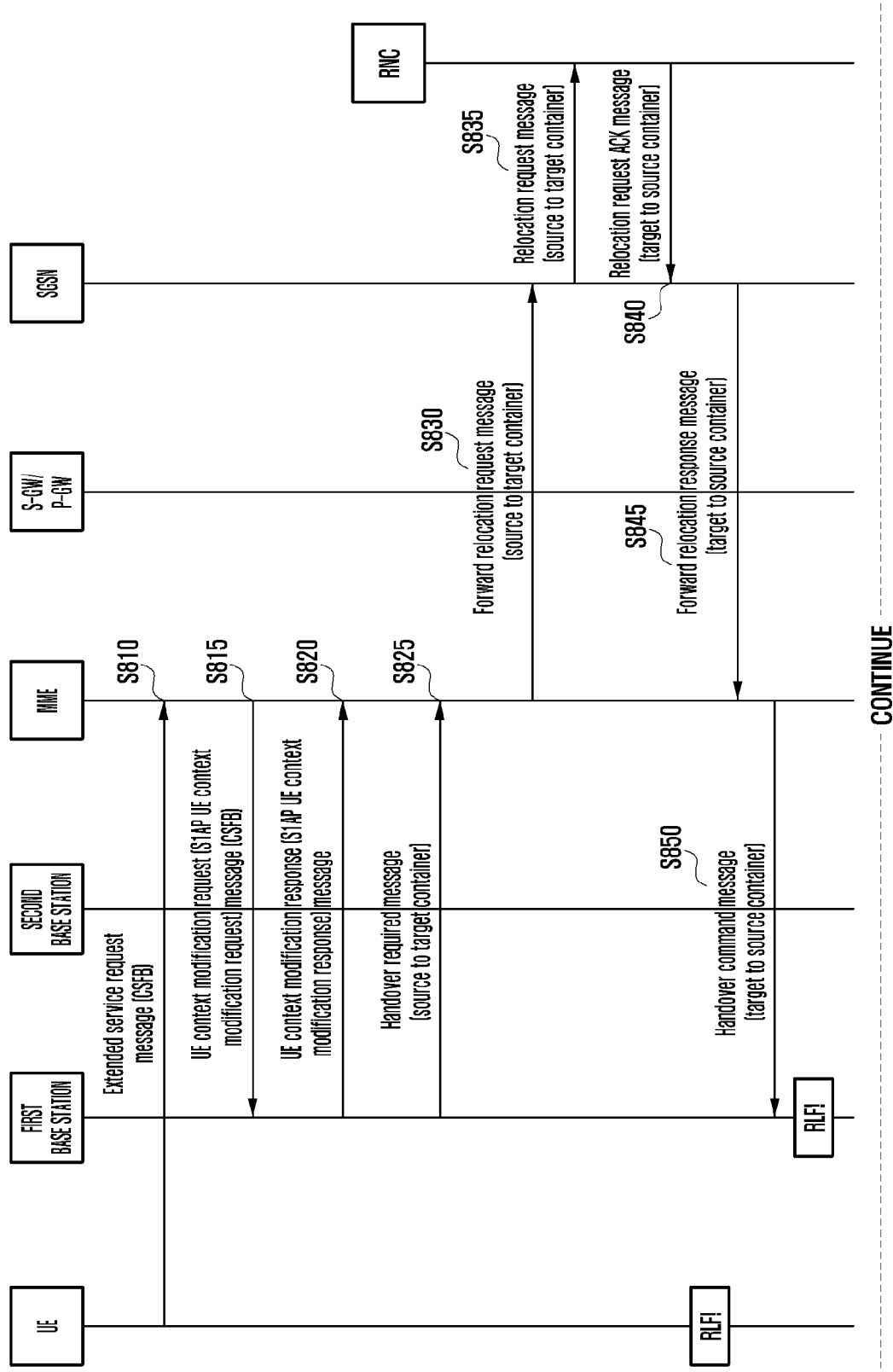

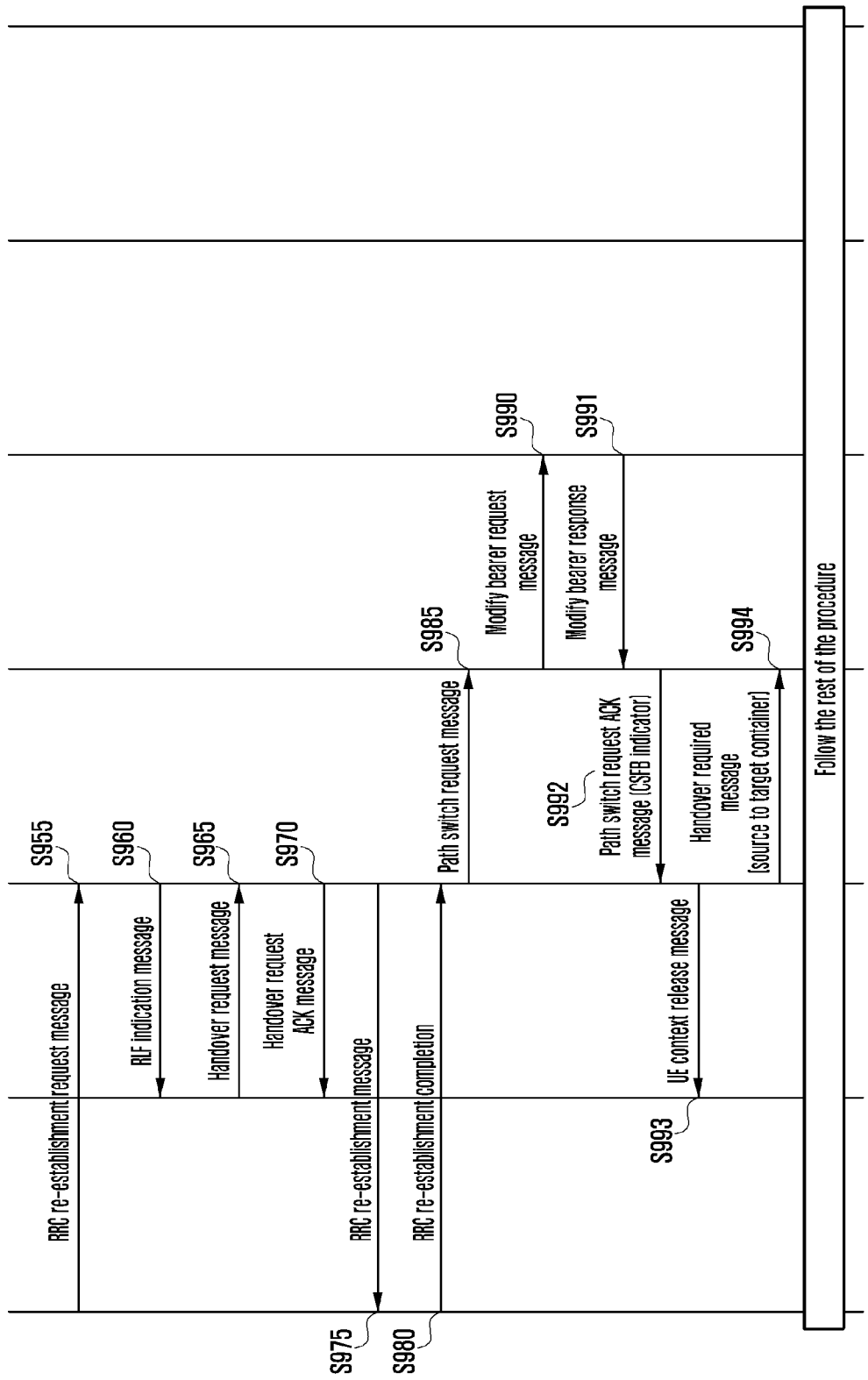

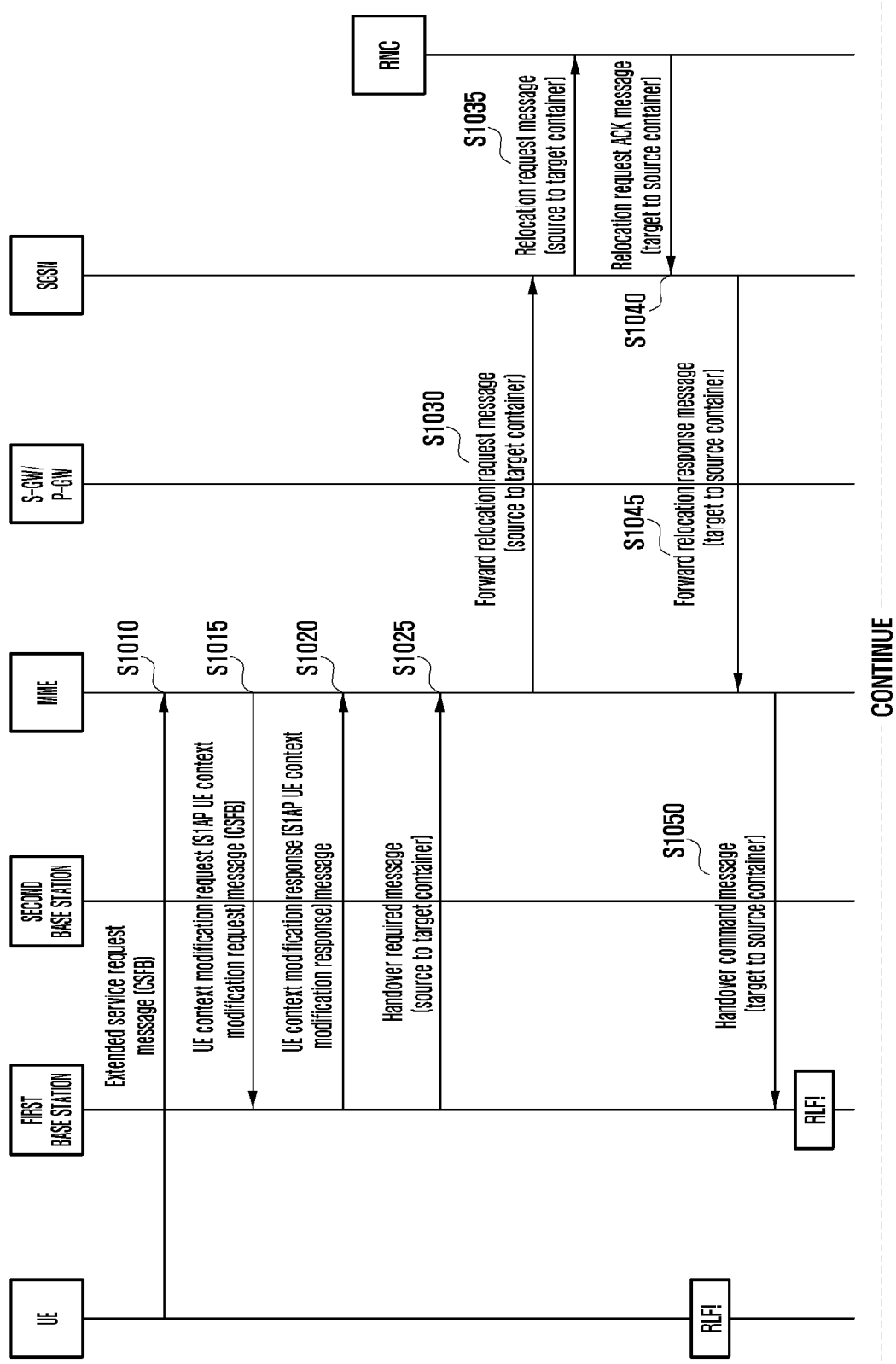

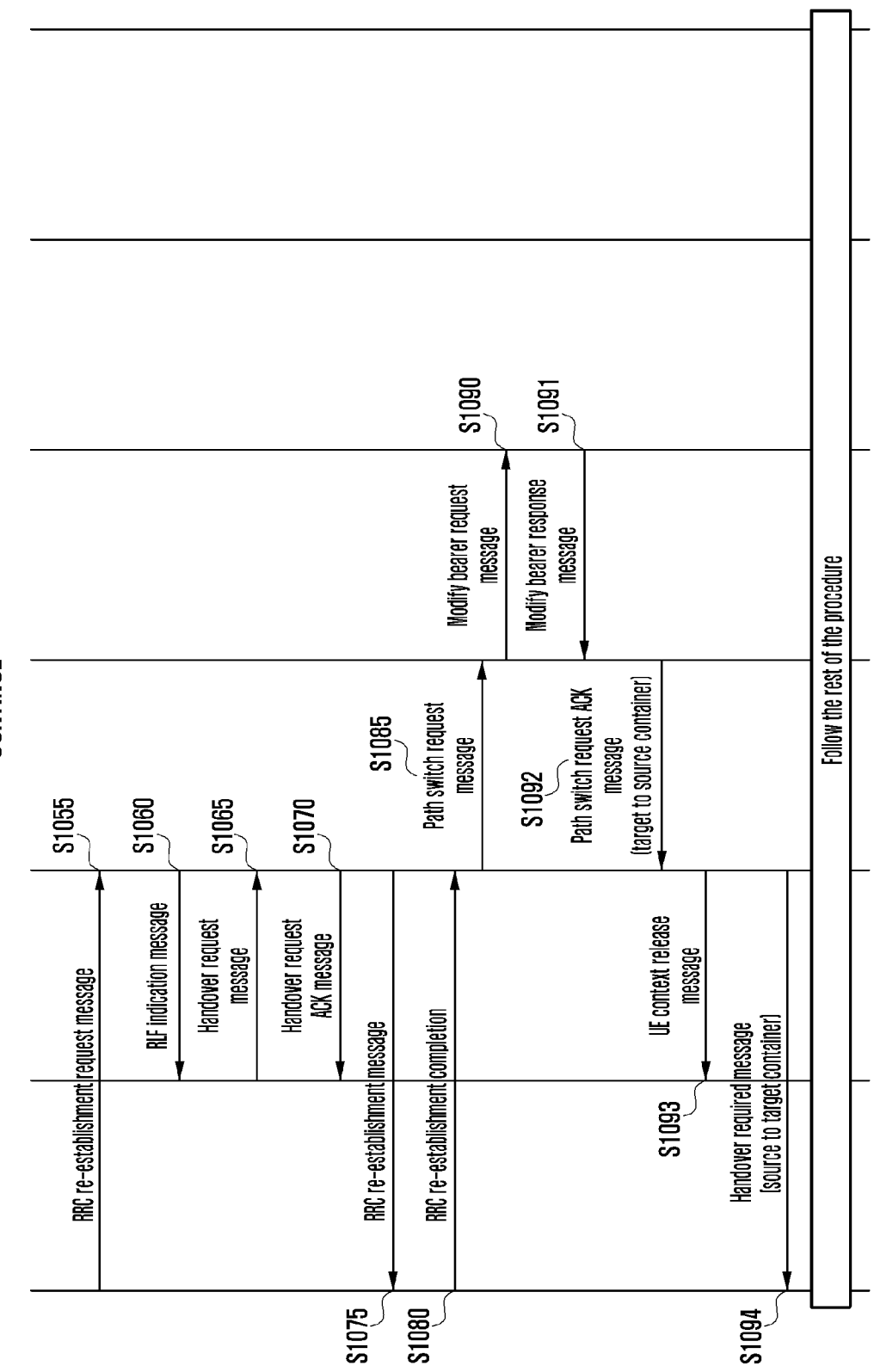

METHOD AND DEVICE FOR PROVIDING CIRCUIT SWITCHING SERVICE IN WIRELESS COMMUNICATION SYSTEM

TECHNICAL FIELD

Various embodiments relates to a wireless communication system, and more particularly, to a method and apparatus for providing a circuit switching (hereinafter, referred to as CS) service for a voice call service of a terminal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Generally, mobile communication systems have been developed to provide a voice service while securing activity of a user. However, the mobile communication systems are extending their fields from a voice service to a data service. At present, the mobile communication system has been developed to provide a high-speed data service. However, since the current mobile communication systems that are providing services suffers from a resource shortage phenomenon and do not meet a user demand for higher-speed services, there is a need for a more developed mobile communication system. To meet the requirement, standardizations for long term evolution (LTE) in the 3rd generation partnership project (3GPP) as one system that is being developed as next-generation mobile communication systems are in progress. The LTE is a technology of implementing fast packet based communication having a transmission rate up to 100 Mbps or so.

At this time, the LTE supports packet switch (hereinafter, referred to as PS)-based communication and does not support CS-based communication. The CS-based communication is a scheme for exchanging voice signals by establishing a communication line between an origination and a destination, and can be used for voice communication. Therefore, when the terminal needs to perform voice communication, the LTE system may use a method for connecting a terminal to systems (UTRAN, GERAN) supporting a CS scheme to provide a voice service by the CS scheme (hereinafter, it can be expressed as providing a CS service). This is called CS Fallback (hereinafter, referred to as CSFB).

However, if a radio resource connection with a base station is disconnected before being connected to the system supporting the CS scheme after the terminal requests the CSFB, the problem in that the base station to which the terminal is newly connected cannot identify whether or not the CSFB request is made and thus the CSFB procedure requested by the terminal is delayed may arise.

DISCLOSURE OF INVENTION

Technical Problem

An object of the present disclosure is directed to provision of a method for quickly performing CSFB when a terminal needs to be connected to a new base station due to a radio resource connection failure prior to receiving a response to a CSFB request.

Solution to Problem

Various embodiments of the present disclosure are directed to the provision of a method for receiving a circuit switching (CS) service of a terminal, comprising: transmitting a CS fallback (CSFB) request to a mobility management entity (MME) through a first base station to use the CS service; detecting a failure of a radio resource connection to the first base station; and transmitting, to a second base station, a radio resource re-establishment related message including a CSFB indicator for identifying the CSFB request.

Various embodiments of the present disclosure are directed to the provision of a method for providing a circuit switching (CS) service of a first base station, comprising: receiving a CS fallback (CSFB) request through a mobility management entity (MME) to use the CS service transmitted from a terminal; detecting a failure of a radio resource connection to the terminal; receiving an RLF indication from a second base station; and transmitting, to the second base station, a handover request message including a CSFB indicator for identifying the CSFB request.

Various embodiments of the present disclosure are directed to the provision of a method for providing a circuit switching (CS) service of a mobility management entity (MME), comprising: receiving a CS fallback (CSFB) request through a first base station to use the CS service transmitted from a terminal; receiving a path switch request message from a second base station according to a failure of a radio resource connection between the first base station and the terminal; and transmitting a path switch ACK message including the CSFB indicator for identifying the CSFB request to the second base station.

Various embodiments of the present disclosure are directed to the provision of a method for providing a circuit switching (CS) service of a second base station, comprising: receiving a radio resource re-establishment request message from a terminal according to a failure of a radio resource connection between a first base station and the terminal; receiving a handover request message from the first base station; and transmitting a reject message for the radio resource re-establishment request message according to information included in the handover request message.

Various embodiments of the present disclosure are directed to the provision of a terminal for receiving a circuit switching (CS) service, comprising: a transceiver configured to perform communication with another network entity; and a controller configured to perform a control to transmit a CS fallback (CSFB) request to a mobility management entity (MME) through a first base station to use the CS service, detect a failure of a radio resource connection to the first base station, and transmit, to a second base station, a radio resource re-establishment related message including a CSFB indicator for identifying the CSFB request.

Various embodiments of the present disclosure are directed to the provision of a base station for providing a circuit switching (CS) service of a first base station, comprising: a transceiver configured to perform communication with another network entity; and a controller configured to perform a control to receive a CS fallback (CSFB) request through a mobility management entity (MME) to use the CS service transmitted from a terminal, detect a failure of a radio resource connection to the terminal, receive an RLF indication from a second base station, and transmit, to the second base station, a handover request message including a CSFB indicator for identifying the CSFB request.

Various embodiments of the present disclosure are directed to the provision of a mobility management entity (MME) for providing a circuit switching (CS) service, comprising: a transceiver configured to perform communication with another network entity; and a controller configured to perform a control to receive a CS fallback (CSFB) request through a first base station to use the CS service transmitted from a terminal, receive a path switch request message from a second base station according to a failure of a radio resource connection between the first base station and the terminal, and transmit a path switch ACK message including the CSFB indicator for identifying the CSFB request to the second base station.

Various embodiments of the present disclosure are directed to the provision of a base station for providing a circuit switching (CS) service of a second base station, comprising: a transceiver configured to perform communication with another network entity; and a controller configured to perform a control to receive a radio resource re-establishment request message from a terminal according to a failure of a radio resource connection between a first base station and the terminal, receive a handover request message from the first base station, and transmit a reject message for the radio resource re-establishment request message according to information included in the handover request message.

Advantageous Effects of Invention

According to the embodiment of the present disclosure, when the terminal intends to use the CS service in the area where the LTE coverage is weak, it is possible to quickly resume the CS service establishment procedure (CSFB procedure) despite suffering the radio resource connection failure due to the LTE coverage. Accordingly, the user does not experience a time delay in establishing a telephone connection when making or receiving a call, such that the user quality can be increased.

BRIEF DESCRIPTION OF DRAWINGS

FIG. 5 is a diagram illustrating a method for receiving, by a terminal, a CS service according to a third embodiment of the present disclosure.

FIG. 10 is a diagram illustrating another method for receiving, by a terminal, a CS service according to an eighth embodiment of the present disclosure.

MODE FOR THE INVENTION

Figure 1:
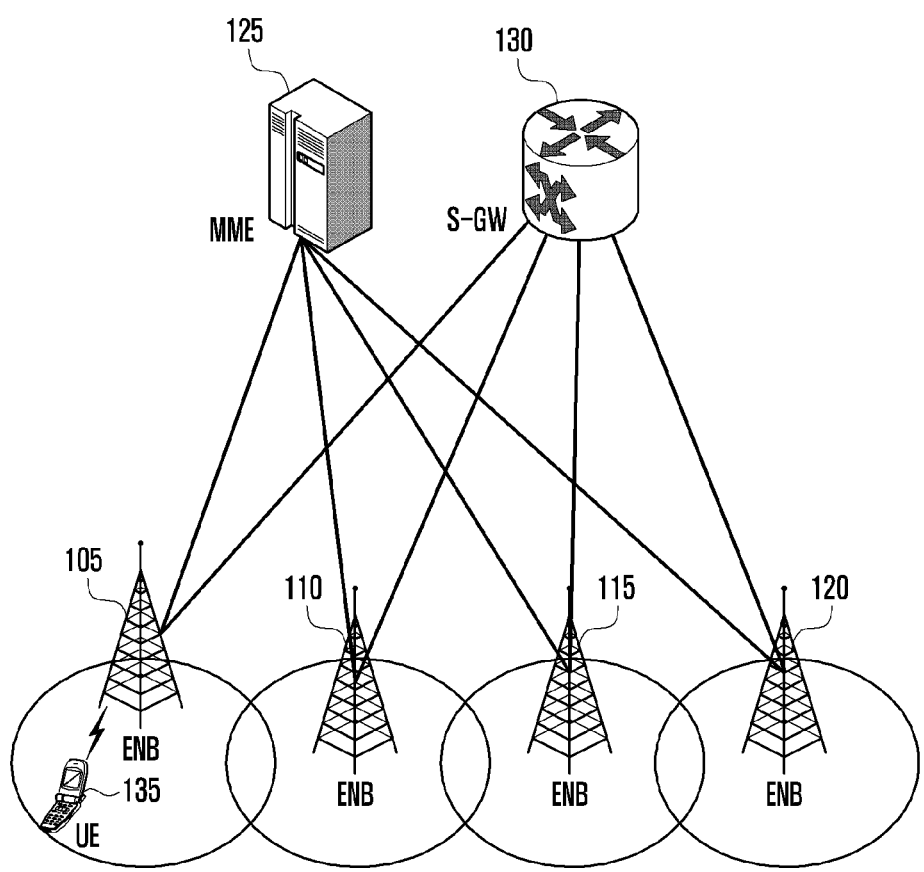
FIG. 1 is a diagram illustrating a structure of an LTE system to which the present disclosure is applied.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the computer program instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are contiguously illustrated may be substantially simultaneously performed in fact or be performed in a reverse sequence depending on corresponding functions sometimes.

Here, the term '~unit' used in the present embodiment means software or hardware components such as FPGA and ASIC and the 'unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

FIG. 1 is a diagram illustrating a structure of an LTE system to which the present disclosure is applied.

As illustrated in FIG. 1, a radio access network 100 of an LTE system includes an Evolved Node B (hereinafter, referred to as an RAN node, an ENB, a Node B, or a base station) 105, 110, 115, and 120, mobility management entity 125 (hereinafter, referred to as an MME) called a core network node, and a serving gateway (hereinafter, referred to as S-GW) 130. User equipment (hereinafter, UE or terminal) 135 is connected to an external network via the ENBs 105, 110, 115, and 120 and the S-GW 130.

In addition, although not illustrated in FIG. 1, the radio access network may include an application function and a policy control and charging rules function (PCRF). In addition, the radio access network may further include or be coupled to a universal terrestrial radio access network (UTRAN), a GSM EDGE radio access network (GERAN), a serving GPRS support node (SGSN), and a home subscriber server (HSS) or may be connected the entity/system.

In FIG. 1, the ENBs 105, 110, 115, and 120 correspond to the existing node B of a universal mobile telecommunications system (UMTS). The ENB is connected to the UE 135 on a radio channel and performs more complicated role than the existing node B. In the LTE system, in addition to a real-time service like a voice over Internet protocol (VoIP) through the Internet protocol, all the user traffics are served on a shared channel and therefore an apparatus for collecting and scheduling state information such as a buffer state, an available transmission power state, and a channel state of the UEs is required. Here, the ENBs 105, 110, 115, and 120 take charge of the collection and scheduling. One ENB generally controls a plurality of cells.

For example, to implement a transmission rate of 100 Mbps, the LTE system uses, as a radio access technology, orthogonal frequency division multiplexing (hereinafter, referred to as OFDM), for example, in a bandwidth of 20 MHz. Further, the LTE system may use an adaptive modulation and coding (hereinafter, referred to as AMC) scheme that determines a modulation scheme and a channel coding rate according to the channel state of the terminal.

The S-GW 130 is an apparatus for providing a data bearer and generates or removes the data bearer under the control of the MME 125.

The MME 125 is an apparatus for performing a mobility management function for the terminal and various control functions, and is connected to a plurality of base stations. Specifically, the ENB and the MME may be connected to manage the mobility of the terminal, and the connection between the MME and the ENB may be referred to as an S1 connection. The MME is a core for managing the mobility of the terminal, and serves to relay the connection between the ENB and the S-GW/P-GW. The control signal of the terminal is transmitted to the MME via the ENB. The MME negotiates with the S-GW/P-GW when necessary and processes the control signal. The data signal of the terminal is transmitted to the S-GW/P-GW via the ENB.

Figure 2:
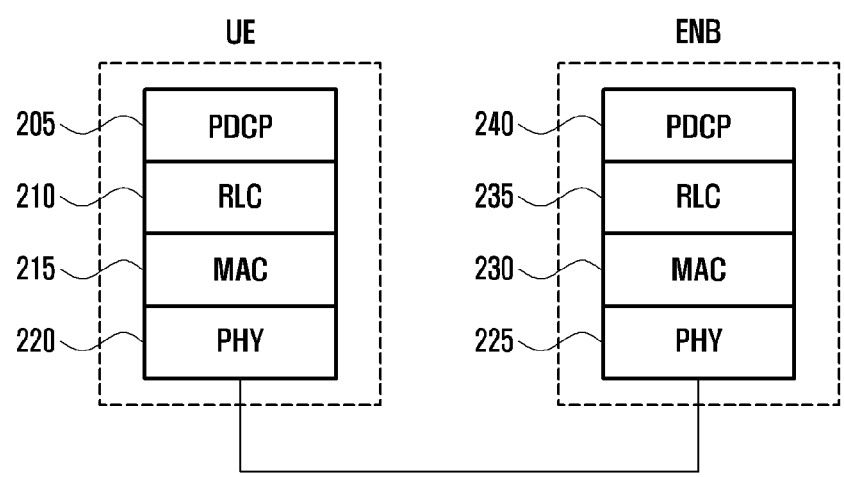
FIG. 2 is a diagram illustrating a radio protocol structure in the LTE system to which the present disclosure is applied.

FIG. 2 is a diagram illustrating a radio protocol structure in the LTE system to which the present disclosure is applied.

Referring to FIG. 2, the radio protocol of the LTE system includes packet data convergence protocols 205 and 240, radio link controls (hereinafter, RLCs) 210 and 235, medium access controls (hereinafter, MACs) 215 and 230, and physical layers (PHYs) 220 and 225, in a terminal and an ENB, respectively.

The PDCPs 205 and 240 are responsible for operations such as IP header compression/decompression.

The RLCs 210 and 235 reconfigure a PDCP packet data unit (PDCP PDU) received from a PDCP layer to an appropriate size, thereby performing an ARQ operation or the like.

The MACs 215 and 230 are connected to several RLC layer apparatuses that are configured in one terminal and performs an operation of multiplexing RLC PDUs into MAC PDU and demultiplexing the RLC PDUs from the MAC PDU received from the RLC layer.

The physical layers 220 and 225 perform an operation of channel-coding and modulating higher layer data, making the higher layer data as an OFDM symbol, and transmitting the higher layer data on the radio channel or an operation of demodulating the OFDM symbol received on the radio channel, channel-decoding the OFDM symbol, and transmitting the OFDM symbol to a higher layer. Further, the physical layer uses a hybrid ARQ (HARQ) for additional error correction and a receiving end transmits whether to receive a packet transmitted from a transmitting end by 1 bit. This is called HARQ acknowledge (ACK)/negative acknowledge (NACK) information.

Downlink HARQ ACK/NACK information on an uplink transmission may be transmitted on a physical hybrid-ARQ indicator channel (PHICH), and uplink HARQ ACK/NACK information on a downlink transmission may be transmitted on a physical uplink control channel (PUCCH) or a PUSCH physical channel.

On the other hand, the terminal may request the CSFB to the LTE system when it wants to use the CS service or receives paging for using the CS service from the base station. In the case where the terminal uses the CS service, a case of using a voice call may be described as an example.

When the terminal requests the CSFB, the LTE system may transmit and receive information for changing a system of a terminal to and from the system (hereinafter, referred to as a target system) supporting the CS scheme. In addition, the LTE system may instruct the terminal to perform handover together with information that may be connected to a target system, thereby connecting the terminal to a target system.

However, if a radio resource connection is disconnected from the connected base station (hereinafter, referred to as a first base station) before the terminal requesting the CSFB receives a handover command (or if a radio resource connection fails, a radio link failure (RLF)), the terminal can attempt the radio resource connection again by searching for a cell with the strongest signal. For example, the case in which the radio resource connection between the terminal and the base station is disconnected may include a case in which radio interference occurs due to a long distance between the terminal and the base station or an obstacle between the terminal and the base station, a radio resource propagation signal received by the base station is weak, a problem arises in a modem of the terminal, or the like. The LTE system can perform a preparation for performing the CSFB procedure requested by the terminal while the terminal is attempting the radio resource connection.

If a cell for which a terminal newly searches is a cell of a base station (hereinafter, a base station to which a terminal is newly connected may be referred to as a second base station) different from the first base station, the second base station cannot know whether the connected terminal is the terminal receiving the CSFB. Therefore, although the terminal is connected to the second base station by re-establishing the radio resource connection to the second base station, the second base station does not perform the CSFB procedure. Therefore, the terminal waits for the response to the CSFB for a predetermined period of time. That is, the situation in which a user does not make a call for a predetermined period of time after requesting the CS service may be described as an example. Accordingly, the terminal may operate a timer for a predetermined period of time and then waits to determine that the CSFB request has failed if the timer expires. If it is determined that the CSFB request has failed, the terminal may be disconnected from the LTE system and attempt a connection to the system supporting the CS service.

Therefore, if the terminal fails to establish the radio resource connection with the base station prior to receiving the handover command, the terminal inconveniently waits for a predetermined time (for example, a predetermined timer time) till using the CS service, which may be a factor that degrades the user experience quality.

The present disclosure proposes a method for quickly resuming a CSFB procedure when a terminal requesting CSFB fails to establish a radio resource connection with a base station prior to receiving a handover command.

Figure 3A:
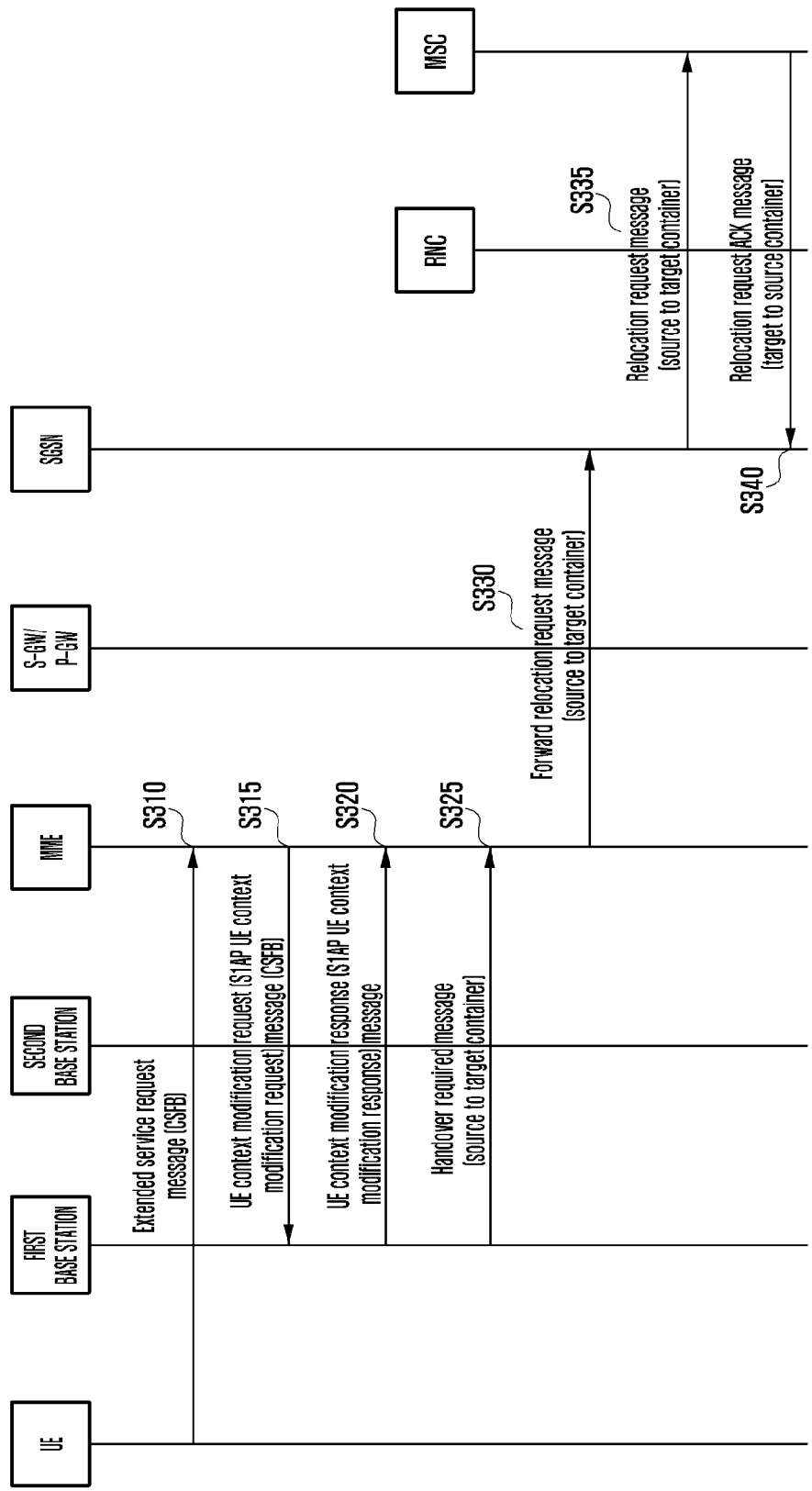
FIG. 3 is a diagram illustrating a method for receiving, by a terminal, a CS service according to a first embodiment of the present disclosure.
Figure 3B:
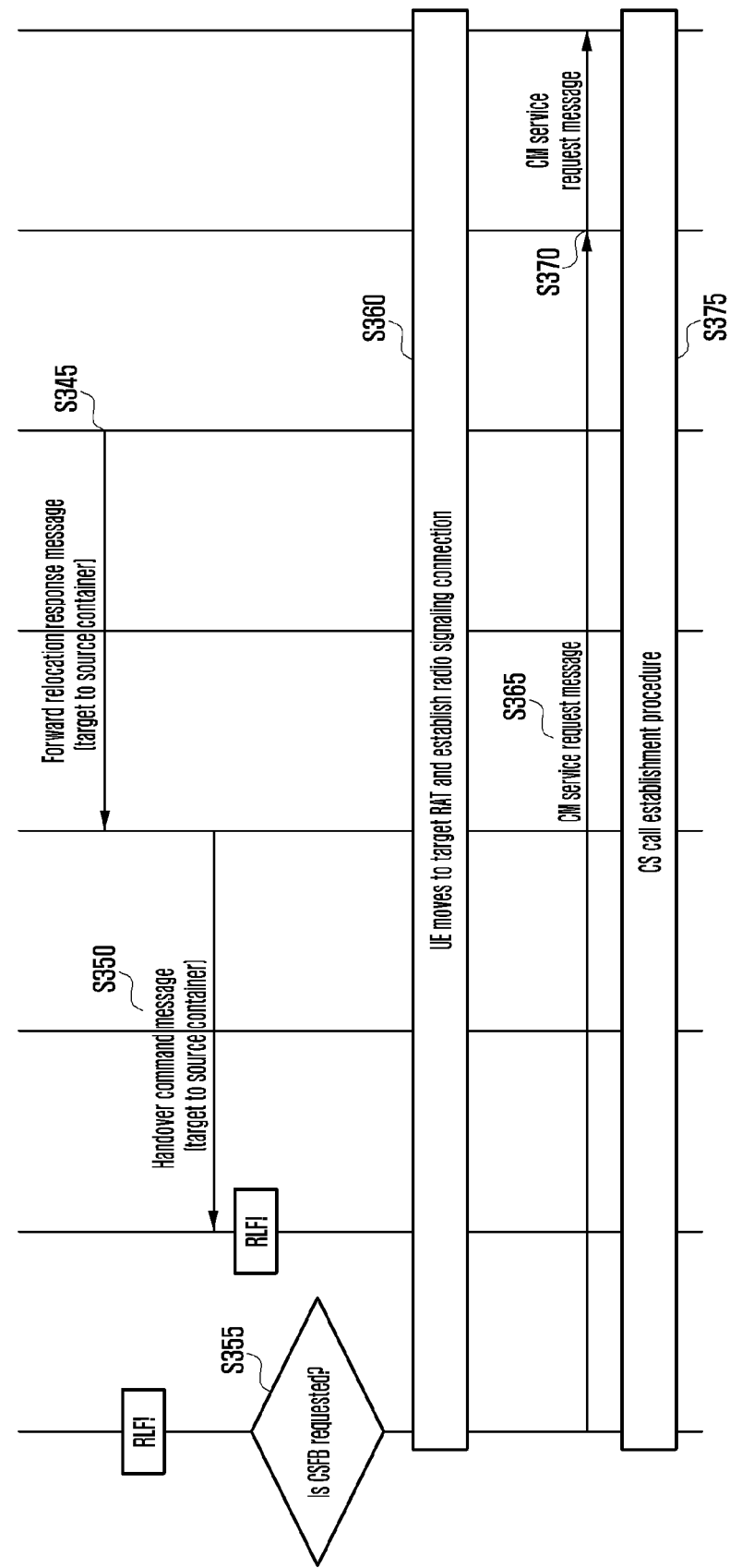

FIG. 3 is a diagram illustrating a method for receiving, by a terminal, a CS service according to a first embodiment of the present disclosure.

The terminal that has used the LTE system may request a CS service to use a voice call, and a procedure performed to request the CS service may be referred to as a CS Fallback (hereinafter, CSFB) procedure.

If the terminal initiates the CS service or receives the paging for the CS service, in step S310, the terminal may transmit an extended service request message to the MME to initiate the CSFB procedure.

If the terminal notifies the MME to perform the CSFB procedure with the extended service request message, in step S315, the MME may transmit an UE context modification request (S1AP UE context modification request) message to an eNB. The MME may transmit a CSFB indicator to the eNB by including the CSFB indicator in the UE context modification request message.

The eNB receiving the UE context modification request message may identify that the corresponding terminal needs to move to a system (for example, UTRAN or GERAN) for receiving the CS service based on a specific field or information of the received context modification request message. In the present disclosure, a system to which a terminal moves to receive the CS service may be referred to as a target system. In step S320, the eNB may transmit to the MME the UE context modification response (S1AP UE context modification response) message including specific information as a response to the UE context modification request message.

In addition, the eNB may receive a measurement report from the terminal to determine a cell of the target system (target RAT, for example, UTRAN or GERAN) to which the terminal moves. In addition, the eNB may include context information of the terminal to be forwarded to the base station of the determined target system (target RAT) in first container information (source to target container). The first container information may include radio access related information on the terminal.

In addition, in step S325, the terminal may transmit the first container information (source to target container) to the MME by including the first container information in a handover required message.

In step S330, the MME receiving the handover required message may transmit a forward relocation request message to a core network entity of the target system (target RAT), that is, the SGSN. The forward relocation request message may include all or part of the first container information (source to target container information) that the eNB forwards.

The SGSN receiving the forward relocation request message may identify that the terminal managed by the MME moves to a management area of the SGSN based on the specific information of the forward relocation request message. Therefore, in step S335, the SGSN may transmit the relocation request message to a base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S340, the base station (RNC) that successfully receives the relocation request message may transmit a relocation request ACK message to the SGSN to provide a response. The relocation request ACK message may include second container information (target to source container information). The second container information (target to source container information) may include the radio access related information on the terminal to access the base station (RNC) of the target system (target RAT).

In step S345, the SGSN receiving the relocation request ACK may transmit the forward relocation response message including all or part of the second container information (target to source container) to the MME.

The MME may receive a forward relocation response message and identify that the target system (target RAT) is prepared for handover based on some information of the forward relocation response message. Accordingly, in step S350, the MME may transmit a handover command message including the second container information (target to source container information) to the first base station to handover the terminal.

If the radio resources of the first base station and the terminal are connected, the first base station may transmit a handover command to the terminal based on a handover command message received from the MME, and simultaneously forward the radio access information for accessing the base station of the target system (target RAT) included in the second container information (target to source container).

If the terminal completes the handover to the target system (RAT) providing the CS service and then transmits a CM service request message to the base station (base station of the target RAT, that is, RNC) of the system (RAT) providing the CS service, the base station (RNC) may forward the CM service request message to a mobile switching center (MSC) which is network entity managing the CS service to provide the CS service to the terminal.

On the other hand, after the terminal starts the CSFB procedure through the extended service request message to use the CS service, when the terminal disconnects the radio resource connection from the base station prior to receiving the handover command message from the base station in order to perform the handover to the target system (RAT) providing the CS service, the terminal may not receive the handover command and perform the handover to the system providing the CS service. As described above, the terminal may suffer from the radio interference due to the long distance between the terminal and the existing serving base station (serving eNB, the first base station in the present disclosure) which is connected to the terminal or the obstacle between the terminal and the serving base station, such that the terminal may not keep the radio resource control (RRC) connection with the serving base station (serving eNB). At this time, the terminal may determine that it is in a radio link failure (RLF) state. In this state, the terminal re-establishes the RRC connection to the eNB with the strongest signal through the RRC re-establishment procedure.

The RRC re-establishment procedure is performed on a new eNB (second base station in the present disclosure) at the time of the occurrence of the RLF as described above before the terminal performs the CSFB procedure and then receives the handover command from the serving base station (serving eNB), but a new eNB does not know that the corresponding terminal is performing the CSFB procedure. The terminal recovering the RRC connection based on the RRC re-establishment procedure continuously waits for a response to the CSFB request previously transmitted, and a new eNB does not resume the CSFB procedure because it does not know whether the terminal is in the CSFB. Accordingly, if the terminal waits for a response to the CSFB request for a predetermined period of time and then the timer expires for the predetermined time, the terminal releases the RRC connection with the new eNB and attempts the connection to the target system (target RAT) that can receive the CS service, thereby requesting the CS service. Accordingly, the terminal cannot use a service (for example, a telephone call) for a time preset in a timer, thereby adversely affecting the user experience quality. Accordingly, the present disclosure proposes a method for quickly providing a CS service or quickly resuming a CSFB procedure by proposing a terminal operation, an eNB operation, and an MME operation when a terminal initiating the CSFB procedure suffers from RLF.

The occurrence time of the RLF may occur irrespective of a signaling procedure transmitted and received between the eNB, the MME, the SGSN, and the RNC.

As a result according to the present disclosure, the terminal that intends to use the CS service may use the CS service in a short time even if the RLF occurs.

Accordingly, the terminal may determine that the RLF occurs due to the failure in the radio resource connection with the serving base station (serving eNB), and in step S355, the terminal may identify whether the CSFB procedure according to the CSFB request is being performed if the RLF occurs.

A control plane protocol controller (NAS layer) of the terminal may determine whether the terminal performs the CSFB procedure and can transmit whether to perform the CSFB procedure to the RRC protocol controller (RRC layer) of the terminal. Accordingly, when the RLF occurs, the terminal may identify whether the CSFB procedure is being performed from the control plane protocol controller of the terminal.

In step S360, the terminal identifying the state in which the terminal requests the CSFB may make a determination to attempt the connection to the target system (target RAT) for using the CS service (UE moves to a target RAT and establish a radio signaling connection) without performing the RRC re-establishment procedure to the second base station which is a new eNB.

That is, when the RLF occurs, the terminal identifies whether the terminal is performing the CSFB procedure using the control plane controller of the terminal, and if the terminal requests the CSFB procedure (i.e., transmits the extended service request for CSFB), the terminal can be directly connected to the target system (target RAT) that provides the CS service without performing the RRC re-establishment procedure due to the result for the RLF. In another embodiment, when the terminal transmits the extended service request message for the CSFB, the RRC protocol controller of the terminal stores an indicator indicating that the terminal requests the CSFB and then may made a determination to attempt the connection to the target system (target RAT) providing the CS service without performing the RRC re-establishment procedure when the RLF occurs before receiving a response to the CSFB request from the eNB.

After the terminal is connected to the target system (target RAT) that provides the CS service, in step S365, the terminal transmits the CM service request message to the base station (base station of the target RAT, i.e., the RNC) of the target system (RAT) that provides the CS service.

In step S370, the base station (RNC) of the target system may transmit the CM service request message to the MSC.

By performing the process, in step S380, the terminal may perform a CS call establishment procedure, and the target system may provide the CS service to the terminal.

Figure 4B:
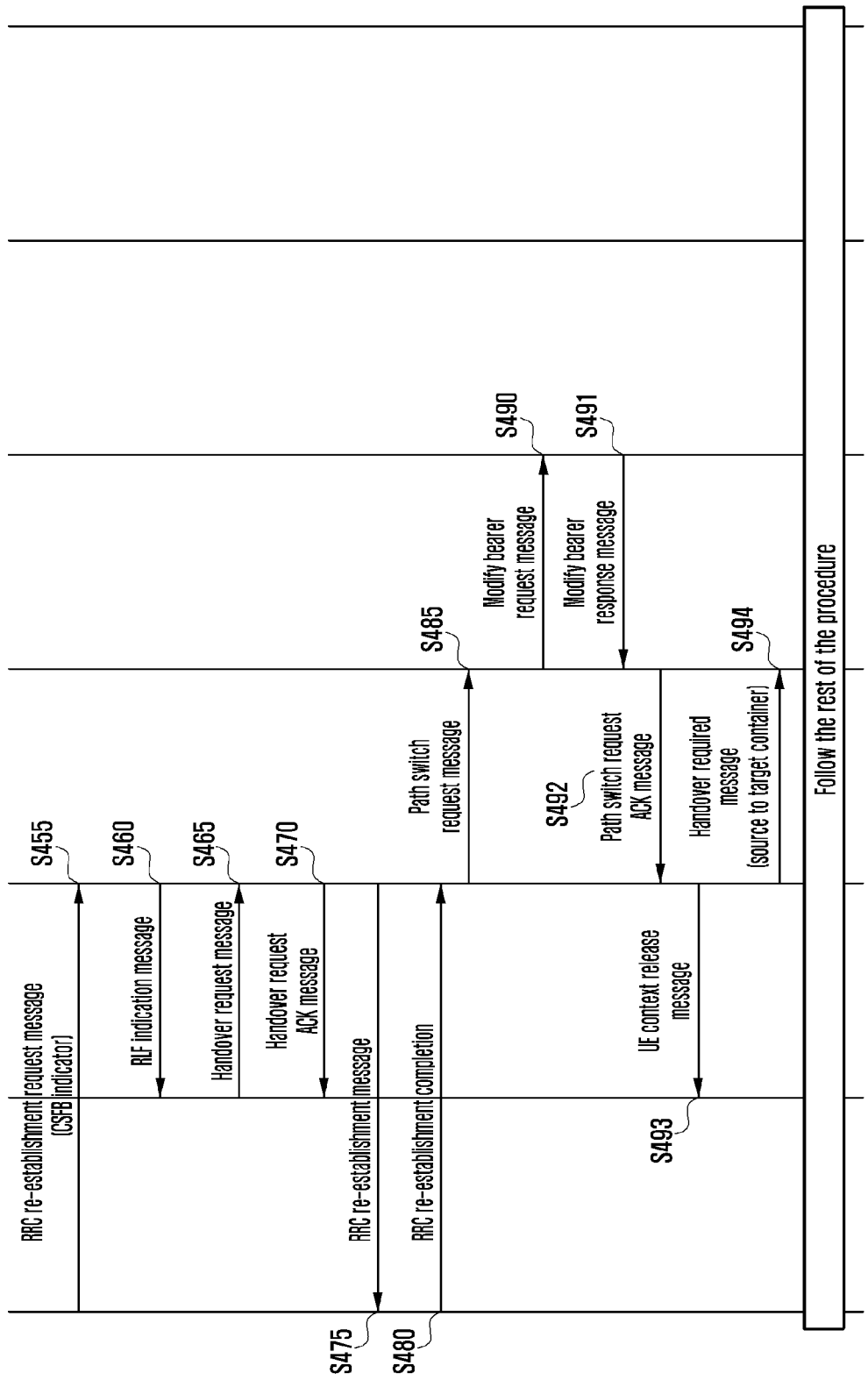
FIG. 4 is a diagram illustrating another method for receiving, by a terminal, a CS service according to a second embodiment of the present disclosure.

FIG. 4 is a diagram illustrating another method for receiving, by a terminal, a CS service according to a second embodiment of the present disclosure.

If the terminal initiates the CS service or receives the paging for the CS service, in step S410, the terminal may transmit an extended service request message to the MME to initiate the CSFB procedure.

If the terminal notifies the MME to perform the CSFB procedure with the extended service request message, in step S415, the MME may transmit an UE context modification request (S1AP UE context modification request) message to an eNB. The MME may transmit the CSFB indicator to the eNB by including the CSFB indicator in the UE context modification request message.

The eNB receiving the UE context modification request message may identify that the corresponding terminal needs to move to a system (for example, UTRAN or GERAN) for receiving the CS service based on a specific field or information of the received context modification request message. In the present disclosure, a system to which a terminal moves to receive the CS service may be referred to as a target system. In step S420, the eNB may transmit to the MME the UE context modification response (S1AP UE context modification response) message including specific information as a response to the UE context modification request message.

In addition, the eNB may receive a measurement report from the terminal to determine a cell of the target system (target RAT, for example, UTRAN or GERAN) to which the terminal moves. In addition, the eNB may include context information of the terminal to be transmitted to the base station of the determined target system (target RAT) in first container information (source to target container). The first container information may include the radio access related information on the terminal. In addition, in step S425, the terminal may transmit the first container information (source to target container) to the MME by including the first container information in the handover required message.

In step S430, the MME receiving the handover required message may transmit a forward relocation request message to a core network entity of the target system (target RAT), that is, the SGSN. The forward relocation request message may include all or part of the first container information (source to target container information) that the eNB transmits.

The SGSN receiving the forward relocation request message may identify that the terminal managed by the MME moves to a management area of the SGSN based on the specific information of the forward relocation request message. Therefore, in step S435, the SGSN may transmit the relocation request message to a base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S440, the base station (RNC) that successfully receives the relocation request message may transmit the relocation request ACK message to the SGSN to provide the response. The relocation request ACK message may include second container information (target to source container information). The second container information (target to source container information) may include the radio access related information on the terminal to access the base station (RNC) of the target system (target RAT).

In step S445, the SGSN receiving the relocation request ACK may transmit the forward relocation response message including all or part of the second container information (target to source container) to the MME.

The MME may receive a forward relocation response message and identify that the target system (target RAT) is prepared for handover based on some information of the forward relocation response message. Accordingly, in step S450, the MME may transmit a handover command message including the second container information (target to source container information) to the first base station to handover the terminal.

If the RLF occurs before the terminal requesting the CSFB receives the response to the CSFB (handover command message from the base station), the terminal recognizing the occurrence of the RLF may perform the RRC re-establishment procedure with the second base station to recover the RRC connection. At this time, the terminal may transmit an indicator indicating that the terminal requests the CSFB to the second base station by including the indicator in the RRC re-establishment message.

For example, a specific controller of the terminal (i.e., the RRC protocol controller (RRC layer)) may store information that can identify whether the terminal requests the CSFB. A method for allowing a terminal to use information that can identify whether the terminal requests CSFB is a method for allowing a terminal to identify whether a bit related to the information is toggled and determine the state in which the terminal requests CSFB if the bit is toggled. Alternatively, the terminal may set the bit related to the information to a specific value, and if the bit is the specific value, a method for allowing a terminal to determine the state in which the terminal requests CSFB is also possible. To this end, the terminal may toggle the information or set the information to the specific value after the start operation of the process or the request transmission during the process of performing the CSFB request, thereby managing the information. Alternatively, the terminal may identify whether the CSFB procedure is requested to the control plane protocol controller (NAS layer) of the terminal according to the recognition that the RLF has occurred, such that the terminal may also identify whether the terminal requests the CSFB. This may be implemented by a method for allowing another specific controller (i.e., the control plane protocol controller, the NAS layer) to store information that identifies whether the terminal requests the CSFB and transmit the information in response to a request from other controllers and allowing the other controller to identify and recognize the information.

The terminal may manage the CSFB request state related information of the terminal described in the various methods to be valid for a preset time. The preset time may be set to a value stored in the terminal or a value received from the network. For example, the terminal may start the preset time related timer based on the modification of the CSFB request state related information, and may manage the timer to expire after the preset time. In this case, the terminal may determine whether the information is a valid value by identifying whether the timer expires when the CSFB request state related information needs to be identified.

In addition, the information may return to the specific controller and thus not be stored in the specific controller, but may be stored in an integrated memory or the like which is accessible by the terminal during the CSFB operation.

In step S455, the terminal determining the state in which the terminal requests the CSFB may transmit to the second base station the RRC re-establishment request message including the indicator (hereinafter, referred to as the CSFB indicator) related to the state where the terminal requests the CSFB or the indicator related to the performance of the CSFB procedure.

The second base station receiving the RRC re-establishment request message may perform the RRC re-establishment procedure with the terminal based on the RRC re-establishment request message. As part of the RRC re-establishment procedure, the second base station may transmit to the first base station a message indicating that the RLF occurs in the terminal, and the first base station may perform the inter-base station handover procedure in order to connect the terminal to the second base station.

Specifically, in step S460, the second base station may transmit an RLF indication message to the first base station.

In step S465, the first base station receiving the RLF indication message may transmit the handover request message to the second base station. In step S470, the second base station receiving a handover request message may transmit to the first base station a handover request ACK message as the response to the handover request message.

In step S475, the second base station, which completes the inter-base station handover, may transmit the RRC re-establishment message to the terminal, such that the terminal may transmit the information for the access to the terminal.

In step S480, the terminal transmits an RRC re-establishment complete message to the second base station to complete the establishment of the RRC connection with the second base station.

The second base station becomes the serving base station of the terminal, and therefore in step S485, the second base station transmits a path switch request message to the MME to notify that the base station serving the corresponding terminal has changed to the second base station.

In step S490, the MME receiving the path change message transmits a modify bearer request message to the S-GW so as to notify the information of the second base station serving the new terminal.

In step S491, the S-GW receiving the modify bearer request message may transmit to the MME a modify bearer response message as a response to the modify bearer request message.

When the modify bearer procedure is completed, in step S492, the MIME may transmit a path switch request ACK message to the second base station to notify that the path switch request is completed.

In step S493, the second base station receiving the path switch ACK message may transmit a UE context release message to the first base station to notify that the UE context release.

When the second base station performing the inter-base station handover and completing the path switch procedure with the MME receives the RRC re-establishment request message from the terminal, the second base station may resume the CSFB procedure for the terminal based on the CSFB indicator that is received.

The second base station configures the first container information (source to target container) including the radio access information of the terminal connected to the second base station, and in step S494, may transmit the handover required message for the CSFB to the MME. Next, the MME receiving the handover required message performs the CSFB procedure on the second base station. Thereafter, the CSFB procedure is similar to the above-described contents and therefore the detailed description thereof will be omitted.

That is, in the present embodiment, the terminal transmits the CSFB indicator by including the CSFB indicator in the RRC re-establishment request message, such that the second base station may identify the state in which the terminal requests the CSFB or that the terminal is performing the CSFB procedure. Accordingly, after the path switch procedure with the MIME is completed, the second base station may transmit the handover required message for moving the terminal to the target system to resume the CSFB procedure for the terminal. Therefore, even when the terminal is disconnected from the existing first base station, the terminal is connected to the system for providing the CS service through the second base station, and thus may seamlessly use the CS service.

The CSFB procedure after the MME receives the handover required message is similar to the above-described contents.

However, the MME may omit the forward relocation procedure.

Specifically, if the MME stores the previously received second container information (target to source container), it is not necessary to receive the second container information by performing the forward relocation procedure again.

In addition, since the base station (RNC) of the target system receives the first container information (source to target container) through the MME in response to the CSFB request of the terminal, the base station knows the information on the terminal, and thus the forward relocation procedure need not be performed.

However, when the first container information or the second container information is changed, the forward relocation procedure may be performed to transmit the first container information to the RNC and receive the second container information from the RNC.

FIG. 5 is a diagram illustrating a method for receiving, by a terminal, a CS service according to a third embodiment of the present disclosure. If the terminal initiates the CS service or receives the paging for the CS service, in step S510, the terminal may transmit the extended service request message to the MME to initiate the CSFB procedure.

If the terminal notifies the MME to perform the CSFB procedure with the extended service request message, in step S515, the MME may transmit the UE context modification request (S1AP UE context modification request) message to the eNB. The MME may transmit the CSFB indicator to the eNB by including the CSFB indicator in the UE context modification request message.

The eNB receiving the UE context modification request message may identify that the corresponding terminal needs to move to the system (for example, UTRAN or GERAN) for receiving the CS service based on the specific field or information of the received context modification request message. In the present disclosure, the system to which the terminal moves to receive the CS service may be referred to as the target system. In step S520, the eNB may transmit to the MME the UE context modification response (S1AP UE context modification response) message including the specific information as the response to the UE context modification request message.

In addition, the eNB may receive the measurement report from the terminal to determine the cell of the target system (target RAT, for example, UTRAN or GERAN) to which the terminal moves. In addition, the eNB may include the context information of the terminal to be transmitted to the base station of the determined target system (target RAT) in the first container information (source to target container). The first container information may include the radio access related information on the terminal. In addition, in step S525, the terminal may transmit the first container information (source to target container) to the MME by including the first container information in the handover required message.

In step S530, the MME receiving the handover required message may transmit the forward relocation request message to the core network entity of the target system (target RAT), that is, the SGSN. The forward relocation request message may include all or part of the first container information (source to target container information) that the eNB transmits.

The SGSN receiving the forward relocation request message may identify that the terminal managed by the MME moves to the management area of the SGSN based on the specific information of the forward relocation request message. Therefore, in step S535, the SGSN may transmit the relocation request message to the base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S540, the base station (RNC) that successfully receives the relocation request message may transmit the relocation request ACK message to the SGSN to provide the response. The relocation request ACK message may include the second container information (target to source container information). The second container information (target to source container information) may include the radio access related information on the terminal to access the base station (RNC) of the target system (target RAT).

In step S545, the SGSN receiving the relocation request ACK may transmit the forward relocation response message including all or part of the second container information (target to source container) to the MME.

The MME may receive the forward relocation response message and identify that the target system (target RAT) is prepared for handover based on some information of the forward relocation response message. Accordingly, in step S550, the MME may transmit the handover command message including the second container information (target to source container information) to the first base station to handover the terminal.

If the RLF occurs before the terminal requesting the CSFB receives the response to the CSFB (handover command message from the base station), the terminal recognizing the occurrence of the RLF may perform the RRC re-establishment procedure with the second base station to recover the RRC connection. At this time, the terminal may transmit the indicator indicating that the terminal requests the CSFB to the second base station by including the indicator in the RRC re-establishment complete message.

In the present embodiment, unlike the embodiment of FIG. 4, the terminal does not transmit the CSFB indicator by including the CSFB indicator in the RRC re-establishment request message, but transmits the CSFB indicator by including the CSFB indicator in the RRC re-establishment complete message completing the RRC re-establishment procedure.

For example, the specific controller of the terminal (i.e., the RRC protocol controller (RRC layer)) may store the information that can identify whether the terminal requests the CSFB. The method for allowing a terminal to use information that can identify whether the terminal requests CSFB is a method for allowing a terminal to identify whether a bit related to the information is toggled and determine the state in which the terminal requests CSFB if the bit is toggled. Alternatively, the terminal may set the bit related to the information to the specific value, and if the bit is the specific value, a method for allowing a terminal to determine the state in which the terminal requests CSFB is also possible. To this end, the terminal may toggle the information or set the information to the specific value after the start operation of the process or the request transmission during the process of performing the CSFB request, thereby managing the information. Alternatively, the terminal may identify whether the CSFB procedure is requested to the control plane protocol controller (NAS layer) of the terminal according to the recognition that the RLF has occurred, such that the terminal may also identify whether the CSFB is requested. This may be implemented by a method for allowing another specific controller (i.e., the control plane protocol controller, the NAS layer) to store information that identifies whether the terminal requests the CSFB and transmit the information in response to a request from other controllers and allowing the other controller to identify and recognize the information.

The terminal may manage the CSFB request state related information of the terminal described in the various methods to be valid for a preset time. The preset time may be set to a value stored in the terminal or a value received from the network. For example, the terminal may start the preset time related timer based on the modification of the CSFB request state related information, and may manage the timer to expire after the preset time. In this case, the terminal may determine whether the information is a valid value by identifying whether the timer expires when the CSFB request state related information needs to be identified.

In addition, the information may return to the specific controller and thus not be stored in the specific controller, but may be stored in an integrated memory or the like which is accessible by the terminal during the CSFB operation.

In step S555, the terminal determining the state in which the terminal requests the CSFB may transmit the RRC re-establishment request message to the second base station.

The second base station receiving the RRC re-establishment request message may perform the RRC re-establishment procedure with the terminal based on the RRC re-establishment request message. As part of the RRC re-establishment procedure, the second base station may transmit to the first base station a message indicating that the RLF occurs in the terminal, and the first base station may perform the inter-base station handover procedure in order to connect the terminal to the second base station.

Specifically, in step S560, the second base station may transmit the RLF indication message to the first base station.

In step S565, the first base station receiving the RLF indication message may transmit the handover request message to the second base station. In step S570, the second base station receiving the handover request message may transmit to the first base station the handover request ACK message as the response to the handover request message.

In step S575, the second base station, which completes the inter-base station handover, may transmit the RRC re-establishment message to the terminal, such that the terminal may transmit the information for the access to the terminal.

In step S580, the terminal transmits the RRC re-establishment complete message including the CSFB indicator, which is an indicator related to the CSFB request or the CSFB procedure, to the second base station, thereby completing the RRC connection establishment with the second base station.

The second base station becomes the serving base station of the terminal, and therefore in step S585, the second base station transmits the path switch request message to the MME to notify that the base station serving the corresponding terminal has changed to itself.

In step S590, the MME receiving the path change message transmits the modify bearer request message to the S-GW so as to notify the information of the second base station serving the new terminal.

In step S591, the S-GW receiving the modify bearer request message may transmit to the MME the modify bearer response message as the response to the modify bearer request message.

When the modify bearer procedure is completed, in step S592, the MME may transmit the path switch request ACK message to the second base station to notify that the path switch request is completed.

In step S593, the second base station receiving the path switch ACK message may transmit the UE context release message to the first base station to notify that the UE context is released.

The second base station may resume the CSFB procedure for the terminal based on the CSFB indicator that is received when the second base station that performs the inter-base station handover and completes the path switch procedure with the MME receives the RRC re-establishment request message from the terminal.

The second base station configures the first container information (source to target container) including the radio access information of the terminal connected to the second base station, and in step S594, may transmit the handover required message for the CSFB to the MME. Next, the MME receiving the handover required message performs the CSFB procedure on the second base station. Thereafter, the CSFB procedure is similar to the above-described contents and therefore the detailed description thereof will be omitted.

That is, in the present embodiment, the terminal transmits the CSFB indicator by including the CSFB indicator in the RRC re-establishment complete message, such that the second base station can identify that the terminal requests the CSFB or that the terminal is performing the CSFB procedure at the time when the second base station completes the re-establishment procedure with the terminal. Accordingly, after the path switch procedure with the MME is completed, the second base station may transmit the handover required message for moving the terminal to the target system to resume the CSFB procedure for the terminal. Therefore, even when the terminal is disconnected from the existing first base station, the terminal is connected to the system for providing the CS service through the second base station, and thus may seamlessly use the CS service.

The CSFB procedure after the MME receives the handover required message is similar to the above-described contents.

However, the MME may omit the forward relocation procedure.

Specifically, if the MME stores the previously received second container information (target to source container), it is not necessary to receive the second container information by performing the forward relocation procedure again.

In addition, since the base station (RNC) of the target system receives the first container information (source to target container) through the MME in response to the CSFB request of the terminal, the base station knows the information on the terminal, and thus the forward relocation procedure need not be performed.

However, when the first container information or the second container information is changed, the forward relocation procedure may be performed to transmit the first container information to the RNC and receive the second container information from the RNC.

Figure 6B:
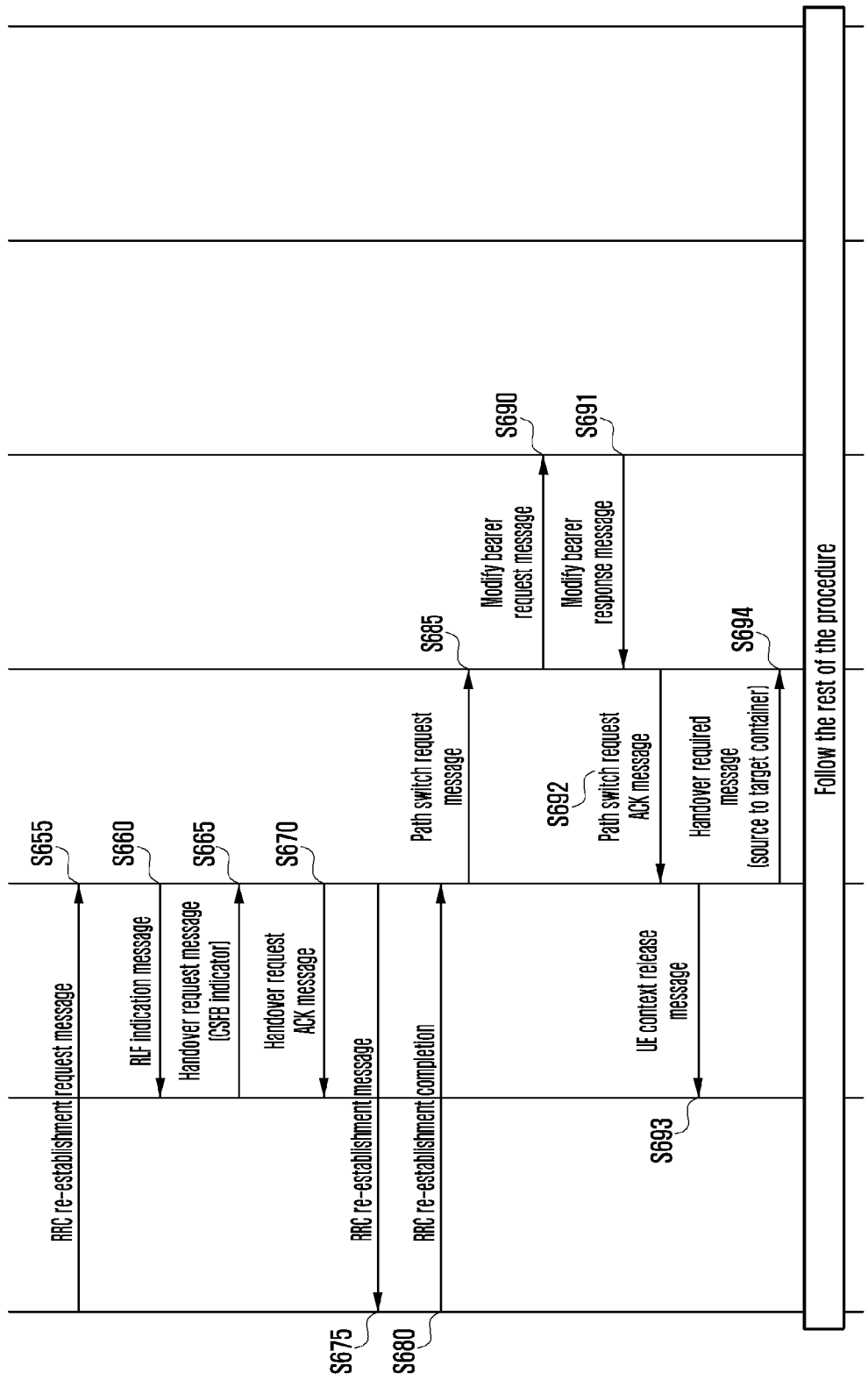
FIG. 6 is a diagram illustrating a method for receiving, by a terminal, a CS service according to a fourth embodiment of the present disclosure.

FIG. 6 is a diagram illustrating a method for receiving, by a terminal, a CS service according to a fourth embodiment of the present disclosure.

In this embodiment, there is provided a method in which when a terminal starts an RRC re-establishment procedure with a second base station, a first base station to which a terminal is connected notifies the second base station that CSFB is being performed before RLF occurs, and the second base station resumes a CSFB procedure. If the terminal initiates the CS service or receives the paging for the CS service, in step S610, the terminal may transmit the extended service request message to the MME to initiate the CSFB procedure.

If the terminal notifies the MME to perform the CSFB procedure with the extended service request message, in step S615, the MME may transmit the UE context modification request (S1AP UE context modification request) message to the eNB. The MME may transmit the CSFB indicator to the eNB by including the CSFB indicator in the UE context modification request message.

The eNB receiving the UE context modification request message may identify that the corresponding terminal needs to move to the system (for example, UTRAN or GERAN) for receiving the CS service based on the specific field or information of the received context modification request message. In the present disclosure, the system to which the terminal moves to receive the CS service may be referred to as the target system. In step S620, the eNB may transmit to the MME the UE context modification response (S1AP UE context modification response) message including specific information as the response to the UE context modification request message.

In addition, the eNB may receive the measurement report from the terminal to determine the cell of the target system (target RAT, for example, UTRAN or GERAN) to which the terminal moves. In addition, the eNB may include the context information of the terminal to be transmitted to the base station of the determined target system (target RAT) in the first container information (source to target container). The first container information may include the radio access related information on the terminal. In addition, in step S625, the terminal may transmit the first container information (source to target container) to the MME by including the first container information in the handover required message.

In step S630, the MME receiving the handover required message may transmit the forward relocation request message to the core network entity of the target system (target RAT), that is, the SGSN. The forward relocation request message may include all or part of the first container information (source to target container information) that the eNB transmits.

The SGSN receiving the forward relocation request message may identify that the terminal managed by the MME moves to the management area of the SGSN based on the specific information of the forward relocation request message. Therefore, in step S635, the SGSN may transmit the relocation request message to the base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S640, the base station (RNC) that successfully receives the relocation request message may transmit the relocation request ACK message to the SGSN to provide the response. The relocation request ACK message may include the second container information (target to source container information). The second container information (target to source container information) may include the radio access related information on the terminal to access the base station (RNC) of the target system (target RAT).

In step S645, the SGSN receiving the relocation request ACK may transmit the forward relocation response message including all or part of the second container information (target to source container) to the MME.

The MME may receive a forward relocation response message and identify that the target system (target RAT) is prepared for handover based on some information of the forward relocation response message. Accordingly, in step S650, the MME may transmit a handover command message including the second container information (target to source container information) to the first base station to handover the terminal.

If the RLF occurs before the terminal requesting the CSFB receives the response to the CSFB (handover command message from the base station), the terminal recognizing the occurrence of the RLF may perform the RRC re-establishment procedure with the second base station to recover the RRC connection.

At this time, unlike FIGS. 4 and 5, the first base station to which the terminal is connected before the occurrence of the RLF may transmit the CSFB indicator to the second base station, thereby notifying the state in which the terminal requests the CSFB or is performing the CSFB procedure.

Specifically, in step S655, the terminal in which the RLF occurs may transmit the RRC re-establishment request message to the second base station.

The second base station receiving the same may perform the RRC re-establishment procedure with the terminal. As part of the RRC re-establishment procedure, the second base station may notify the first base station that the RLF occurs in the terminal, and the first base station may transmit the inter-base station handover procedure in order to connect the terminal to the second base station.

Specifically, in step S660, the second base station may transmit the RLF indication message to the first base station.

The first base station receiving the RLF indication message may identify that the RLF occurs in the terminal. In addition, the first base station receiving the RLF indication message may determine whether the terminal requests the CSFB procedure or is performing the CSFB procedure. At this time, the first base station may identify that the terminal is performing the CSFB procedure based on the S1 UE context modification message or the handover command message that is received from the MME.

Accordingly, in step S665, the first base station identifying that the terminal is performing the CSFB procedure may transmit to the second base station the handover request message including the CSFB indicator indicating the state in which the terminal requests the CSFB or is performing the CSFB procedure. In step S670, the second base station receiving the handover request message may transmit to the first base station the handover request ACK message as the response to the handover request message.

Through the inter-base station handover procedure, the first base station can transmit the UE context to the second base station.

In step S675, the second base station, which completes the inter-base station handover, may transmit the RRC re-establishment message to the terminal, such that the terminal may transmit the information for the access to the terminal.

In step S680, the terminal transmits the RRC re-establishment complete message to the second base station to complete the establishment of the RRC connection with the second base station.

The second base station becomes the serving base station of the terminal, and therefore in step S685, the second base station transmits the path switch request message to the MME to notify that the base station serving the corresponding terminal has changed to itself.

In step S690, the MME receiving the path change message transmits the modify bearer request message to the S-GW so as to notify the information of the second base station serving the new terminal.

In step S691, the S-GW receiving the modify bearer request message may transmit to the MME the modify bearer response message as the response to the modify bearer request message.

When the modify bearer procedure is completed, in step S692, the MME may transmit the path switch request ACK message to the second base station to notify that the path switch request is completed.

In step S693, the second base station receiving the path switch ACK message may transmit the UE context release message to the first base station to notify that the UE context is released.

The second base station may resume the CSFB procedure for the terminal based on the CSFB indicator that is received when the second base station that performs the inter-base station handover and completes the path switch procedure with the MME receives the RRC re-establishment request message from the terminal.

The second base station configures the first container information (source to target container) including the radio access information of the terminal connected to the second base station, and in step S694, may transmit the handover required message for the CSFB to the MME. Next, the MME receiving the handover required message performs the CSFB procedure on the second base station.

In other words, in the present embodiment, the first base station identifying the RLF state of the terminal transmits the CSFB indicator by including the CSFB indicator in the handover request message, and the second base station may identify the state in which the terminal requests the CSFB or is performing the CSFB procedure based on the CSFB indicator. Accordingly, after the path switch procedure with the MME is completed, the second base station may transmit the handover required message for moving the terminal to the target system to resume the CSFB procedure for the terminal. Therefore, even when the terminal is disconnected from the existing first base station, the terminal is connected to the system for providing the CS service through the second base station, and thus may seamlessly use the CS service.

The CSFB procedure after the MME receives the handover required message is similar to the above-described contents. However, the MME may omit the forward relocation procedure.

Specifically, if the MME stores the previously received second container information (target to source container), it is not necessary to receive the second container information by performing the forward relocation procedure again.

In addition, since the base station (RNC) of the target system receives the first container information (source to target container) through the MME in response to the CSFB request of the terminal, the base station knows the information on the terminal, and thus the forward relocation procedure need not be performed.

However, when the first container information or the second container information is changed, the forward relocation procedure may be performed to transmit the first container information to the RNC and receive the second container information from the RNC.

Figure 7A:
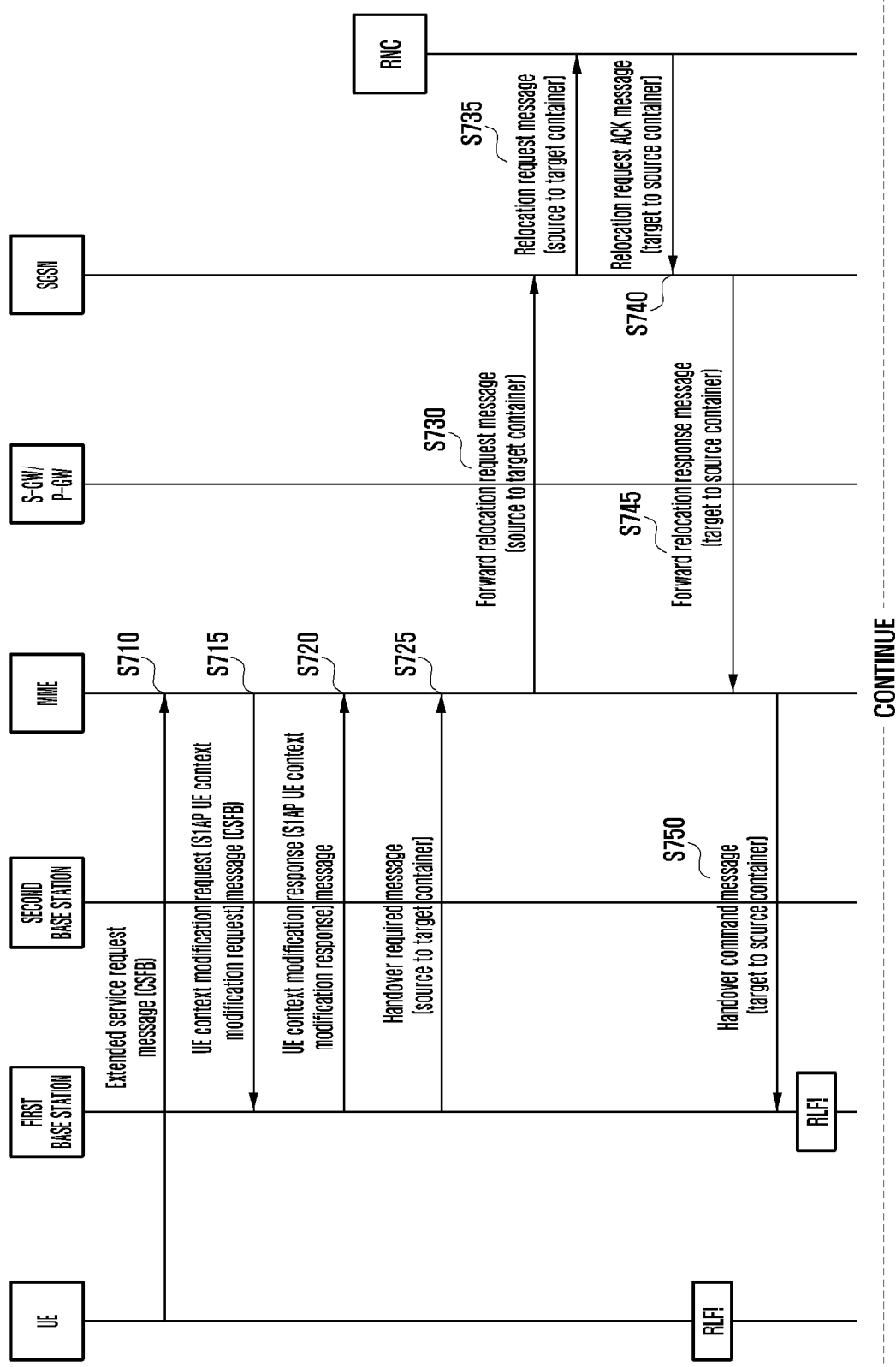
FIG. 7 is a diagram illustrating a method for receiving, by a terminal, a CS service according to a fifth embodiment of the present disclosure.
Figure 7B:
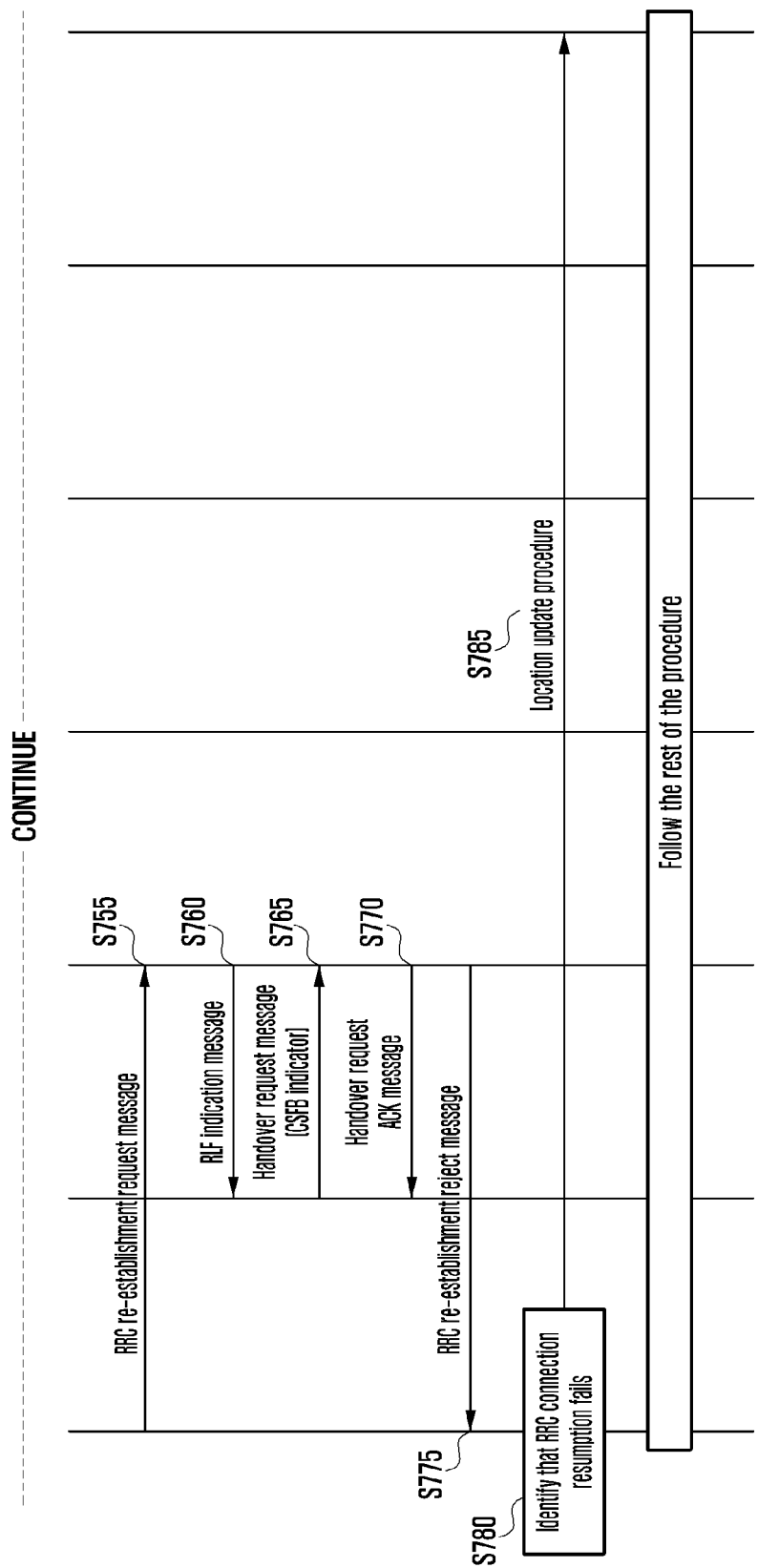

FIG. 7 is a diagram illustrating a method for receiving, by a terminal, a CS service according to a fifth embodiment of the present disclosure.

In FIG. 7, there is provided a method in which when a terminal starts an RRC re-establishment procedure with a second base station, a first base station to which a terminal is connected notifies a second base station that CSFB is being performed before RLF occurs, and the second base station allows the terminal to access a target system (target RAT) for a CS service by rejecting the RRC re-establishment procedure to receive the CS service.

If the terminal initiates the CS service or receives the paging for the CS service, in step S710, the terminal may transmit the extended service request message to the MME to initiate the CSFB procedure.

If the terminal notifies the MME to perform the CSFB procedure with the extended service request message, in step S715, the MME may transmit the UE context modification request (S1AP UE context modification request) message to the eNB. The MME may transmit the CSFB indicator to the eNB by including the CSFB indicator in the UE context modification request message.

The eNB receiving the UE context modification request message may identify that the corresponding terminal needs to move to the system (for example, UTRAN or GERAN) for receiving the CS service based on the specific field or information of the received context modification request message. In the present disclosure, the system to which the terminal moves to receive the CS service may be referred to as the target system. In step S720, the eNB may transmit to the MME the UE context modification response (S1AP UE context modification response) message including the specific information as the response to the UE context modification request message.

In addition, the eNB may receive the measurement report from the terminal to determine the cell of the target system (target RAT, for example, UTRAN or GERAN) to which the terminal moves. In addition, the eNB may include the context information of the terminal to be transmitted to the base station of the determined target system (target RAT) in the first container information (source to target container). The first container information may include the radio access related information on the terminal. In addition, in step S725, the terminal may transmit the first container information (source to target container) to the MME by including the first container information in the handover required message.

In step 730, the MME receiving the handover required message may transmit the forward relocation request message to the core network entity of the target system (target RAT), that is, the SGSN. The forward relocation request message may include all or part of the first container information (source to target container information) that the eNB transmits.

The SGSN receiving the forward relocation request message may identify that the terminal managed by the MME moves to the management area of the SGSN based on the specific information of the forward relocation request message. Therefore, in step S735, the SGSN may transmit the relocation request message to a base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S740, the base station (RNC) that successfully receives the relocation request message may transmit the relocation request ACK message to the SGSN to provide the response. The relocation request ACK message may include the second container information (target to source container information). The second container information (target to source container information) may include the radio access related information on the terminal to access the base station (RNC) of the target system (target RAT).

In step S745, the SGSN receiving the relocation request ACK may transmit the forward relocation response message including all or part of the second container information (target to source container) to the MME.

The MME may receive a forward relocation response message and identify that the target system (target RAT) is prepared for handover based on some information of the forward relocation response message. Accordingly, in step S750, the MME may transmit a handover command message including the second container information (target to source container information) to the first base station to handover the terminal.

If the RLF occurs before the terminal requesting the CSFB receives the response to the CSFB (handover command message from the base station), the terminal recognizing the occurrence of the RLF may perform the RRC re-establishment procedure with the second base station to recover the RRC connection.

Accordingly, in step S755, the terminal in which the RLF occurs may transmit the RRC re-establishment request message to the second base station to request an RRC connection recovery. The second base station may identify the received RRC re-establishment request message to identify the first base station to which the terminal is connected before the RLF occurs.

In step S760, the second base station identifying the first base station may transmit the RLF indication message to the first base station to notify that the RLF occurs in the terminal.

The first base station, which receives the RLF indication message, may determine that the terminal is performing the CSFB procedure. The first base station may identify that the terminal is performing the CSFB procedure based on the S1 UE context modification message or the handover command message that is received from the MME.

In step S765, the first base station identifying that the terminal is performing the CSFB procedure may transmit the handover request message to the second base station.

However, in the present embodiment, the first base station may transmit an indicator for allowing the second base station to reject the RRC re-establishment procedure. Specifically, the first base station may use the following method.

1) The first base station may transmit a message indicating that it does not perform a handover request by including the message in the handover request message transmitted to the second base station. This may be a message indicating that a context fetch operation for transmitting the UE context between the first base station and second base station is not performed.

1-1) In order to indicate the message that the handover request is not performed, the first base station may transmit the handover request message without including the UE context information.

1-2) Alternatively, the information indicating that the UE context fetch is not performed may be included in the handover request message transmitted as the response to the RLF indication message.

Alternatively, in step S765, the first base station may transmit a new message for rejecting the UE context fetch as the response message to the RLF indication message other than the handover request message.

2) Alternatively, when the first base station may transmit the handover request message to the second base station and transmits the UE context to the second base station, the CSFB indicator indicating whether to perform the CSFB procedure of the terminal may be included. The second base station, which receives the same, may determine that the terminal is performing the CSFB procedure.

Accordingly, when receiving the message indicating that the UE context fetch operation is not performed or identifying that the terminal is performing the CSFB procedure, the second base station transmits a handover request ACK message as a response to the handover request message to the first base station in step S770, and transmits an RRC Re-establishment reject message which is a reject message for the RRC re-establishment request in step S775.

Upon receiving the RRC re-establishment reject message, the terminal may identify in step S780 that the RRC connection has failed to resume and determine that the CSFB is requested, thereby attempting an access to the base station of the target system (target RAT) which may use the CS service. That is, the terminal may detect a lower layer failure and attempt an access to the target system for the CS service.

Accordingly, in step S785, the terminal may perform a location update procedure with the base station of the target system. At this time, the first base station, the second base station, and the MME may release the UE context as the terminal leaves the RRC connected state, and the RNC and the SGSN may perform the remaining location update procedure for the terminal. In this way, the terminal accessing the target system (target RAT) may request the CS service to use the voice call service.

Figure 8B:
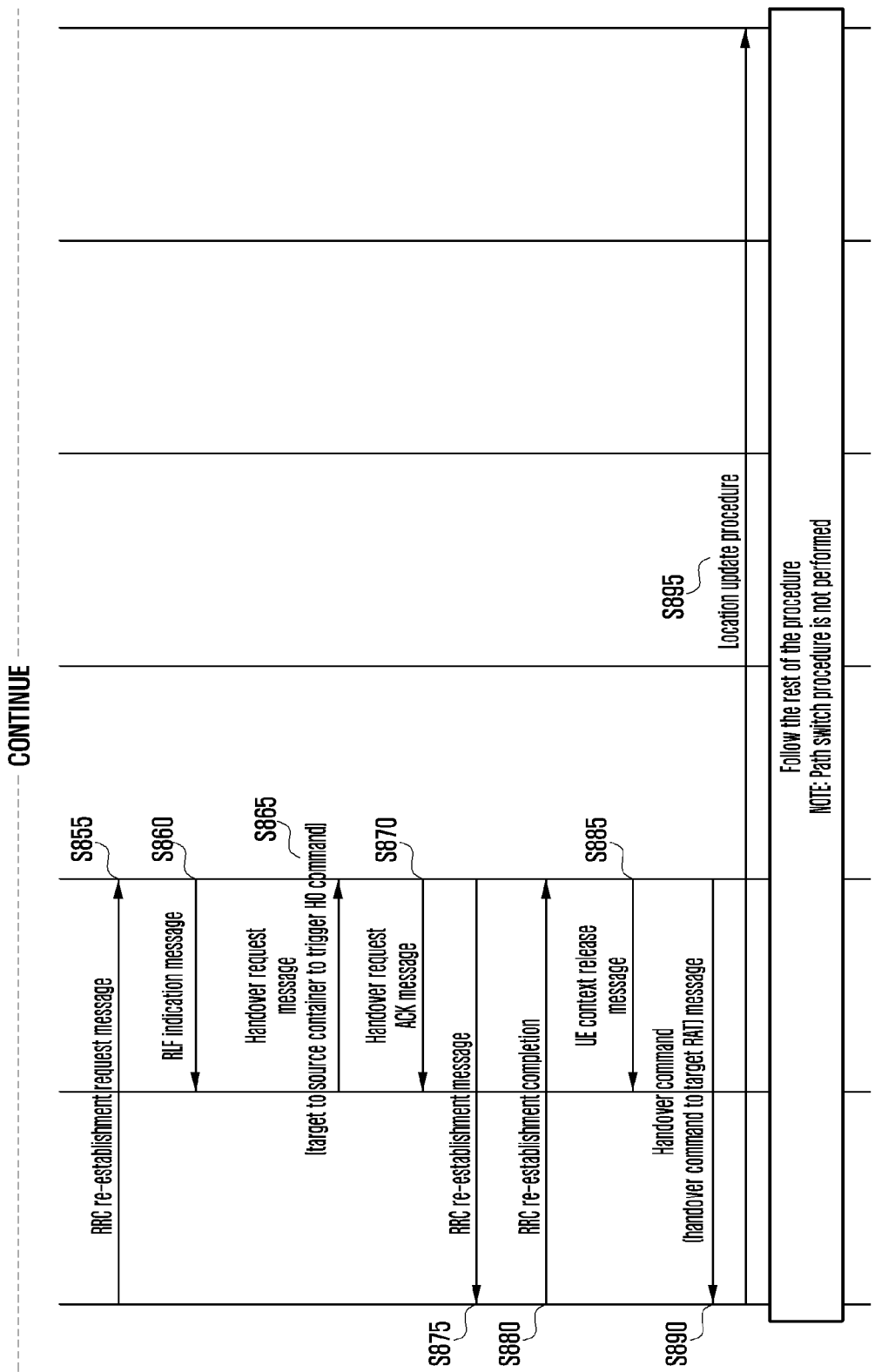
FIG. 8 is a diagram illustrating another method for receiving, by a terminal, a CS service according to a sixth embodiment of the present disclosure.

FIG. 8 is a diagram illustrating another method for receiving, by a terminal, a CS service according to a sixth embodiment of the present disclosure.

In FIG. 8, when the RLF occurs after the terminal requests the CSFB and the terminal starts the RRC re-establishment procedure with the second base station, there is provided the method for allowing the second base station to receive whether the terminal performs the CSFB procedure and the access information of the target system (target RAT) together from the first base station and then transmit the handover command for the CS service to the terminal to provide the CS service.

If the terminal initiates the CS service or receives the paging for the CS service, in step S810, the terminal may transmit an extended service request message to the MME to initiate the CSFB procedure.

If the terminal notifies the MME to perform the CSFB procedure with the extended service request message, in step S815, the MME may transmit an UE context modification request (S1AP UE context modification request) message to an eNB. The MME may transmit the CSFB indicator to the eNB by including the CSFB indicator in the UE context modification request message.

The eNB receiving the UE context modification request message may identify that the corresponding terminal needs to move to the system (for example, UTRAN or GERAN) for receiving the CS service based on the specific field or information of the received context modification request message. In the present disclosure, the system to which the terminal moves to receive the CS service may be referred to as the target system. In step S820, the eNB may transmit to the MME the UE context modification response (S1AP UE context modification response) message including specific information as a response to the UE context modification request message.

In addition, the eNB may receive the measurement report from the terminal to determine the cell of the target system (target RAT, for example, UTRAN or GERAN) to which the terminal moves. In addition, the eNB may include the context information of the terminal to be transmitted to the base station of the determined target system (target RAT) in the first container information (source to target container). The first container information may include the radio access related information on the terminal. In addition, in step S825, the terminal may transmit the first container information (source to target container) to the MME by including the first container information in the handover required message.

In step S830, the MME receiving the handover required message may transmit the forward relocation request message to the core network entity of the target system (target RAT), that is, the SGSN. The forward relocation request message may include all or part of the first container information (source to target container information) that the eNB transmits.

The SGSN receiving the forward relocation request message may identify that the terminal managed by the MME moves to the management area of the SGSN based on the specific information of the forward relocation request message. Therefore, in step S835, the SGSN may transmit the relocation request message to the base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S840, the base station (RNC) that successfully receives the relocation request message may transmit the relocation request ACK message to the SGSN to provide the response. The relocation request ACK message may include the second container information (target to source container information). The second container information (target to source container information) may include the radio access related information on the terminal to access the base station (RNC) of the target system (target RAT).

In step S845, the SGSN receiving the relocation request ACK may transmit the forward relocation response message including all or part of the second container information (target to source container) to the MME.

The MME may receive a forward relocation response message and identify that the target system (target RAT) is prepared for handover based on some information of the forward relocation response message. Accordingly, in step S850, the MME may transmit a handover command message including the second container information (target to source container information) to the first base station to handover the terminal.

If the RLF occurs before the terminal requesting the CSFB receives the response to the CSFB (handover command message from the base station), the terminal recognizing the occurrence of the RLF may perform the RRC re-establishment procedure with the second base station to recover the RRC connection.

Accordingly, in step S855, the terminal in which the RLF occurs may transmit the RRC re-establishment request message to the second base station to request an RRC connection recovery. The second base station may identify the received RRC re-establishment request message to identify the first base station to which the terminal is connected before the RLF occurs.

In step S860, the second base station identifying the first base station may transmit the RLF indication message to the first base station to notify that the RLF occurs in the terminal.

The first base station, which receives the RLF indication message, may determine that the terminal is performing the CSFB procedure. The first base station may identify that the terminal is performing the CSFB procedure based on the S1 UE context modification message or the handover command message that is received from the MME.

In step S865, the first base station determining that the terminal is performing the CSFB procedure may transmit the handover request message, which includes the second container (target to source container) information included in the handover command message received from the MME, to the second base station. At this time, the second container information (target to source container) may include the radio access information for terminal to access the cell of the target system (target RAT).

In step S870, the second base station receiving the handover request message may transmit to the first base station the handover request ACK message as the response to the handover request message. Alternatively, the second base station obtains the information for the handover of the terminal, and since the second base station needs to perform the handover of the terminal to the target system, the second base station may transmit a handover preparation failure message to the first base station to make a determination that the handover procedure has failed and then transmit the handover command to the terminal together with the information for handover to the target system.

In step S875, the second base station, which has completed the handover between the base stations by transmitting the handover request ACK message, may transmit the RRC re-establishment message to the terminal, and in step S880, the terminal may transmit the RRC re-establishment complete message to the second base station to complete the RRC connection establishment with the second base station.

Since the second base station knows that the terminal is performing the CSFB and the information on the target cell to be handed over by the terminal through the second container information (target to source container), the second base station has completed the RRC re-establishment procedure with the terminal and then in step S885, may transmit the UE context release message to the first base station and in step S890, may transmit the handover command message so that the terminal is connected to the cell of the target system (target RAT).

The handover command message may include the CSFB indicator indicating that it is based on the CSFB and may include the radio access information which may access the cell of the target system (target RAT) included in the second container information (target to source container).

In step S895, the terminal receiving the handover command message may re-access the target system (target RAT) cell and request and use the voice call service.

In the present embodiment, after the RRC re-establishment procedure is completed, the path switch procedure and the forward relocation request procedure of the MME may be omitted. The path switch procedure and the forward relocation request procedure of the MME are the process of acquiring the second container information for handing over the terminal to the target system. However, in the present embodiment, since the second container information is acquired from the first base station, the above procedure can be omitted and the handover command message can be directly transmitted to the terminal.

Figure 9A:
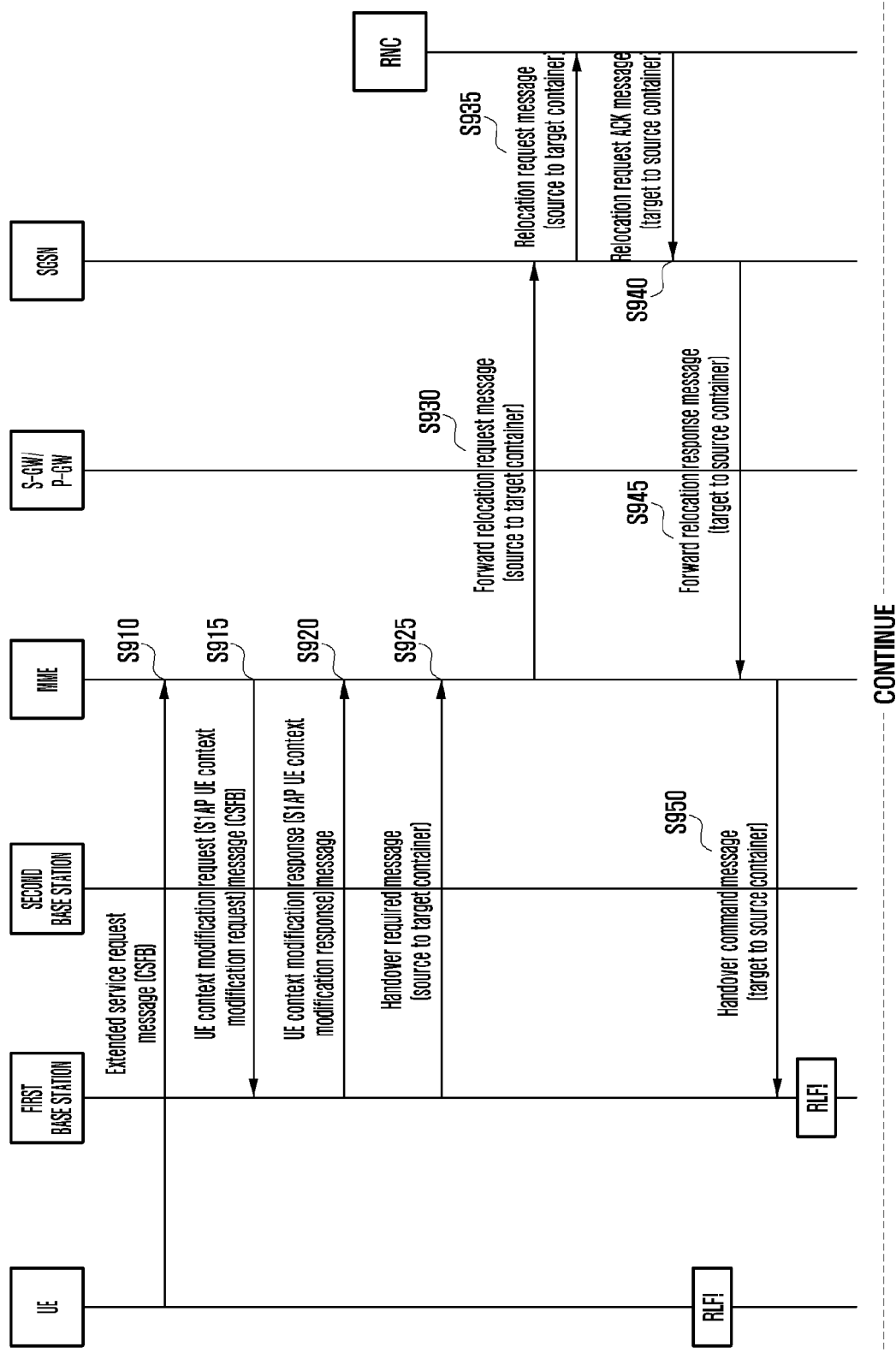
FIG. 9 is a diagram illustrating a method for receiving, by a terminal, a CS service according to a seventh embodiment of the present disclosure.

FIG. 9 is a diagram illustrating a method for receiving, by a terminal, a CS service according to a seventh embodiment of the present disclosure.

The present embodiment proposes a method in which the RLF occurs after the terminal requests the CSFB, and the terminal completes the RRC re-establishment procedure with the second base station and then the second base station receives whether the terminal performs the CSFB procedure from the MME to resume the CSFB procedure.

If the terminal initiates the CS service or receives the paging for the CS service, in step S910, the terminal may transmit an extended service request message to the MME to initiate the CSFB procedure.

If the terminal notifies the MME to perform the CSFB procedure with the extended service request message, in step S915, the MME may transmit the UE context modification request (S1AP UE context modification request) message to the eNB. The MME may transmit the CSFB indicator to the eNB by including the CSFB indicator in the UE context modification request message.

The eNB receiving the UE context modification request message may identify that the corresponding terminal needs to move to the system (for example, UTRAN or GERAN) for receiving the CS service based on the specific field or information of the received context modification request message. In the present disclosure, the system to which the terminal moves to receive the CS service may be referred to as the target system. In step S920, the eNB may transmit to the MME the UE context modification response (S1AP UE context modification response) message including specific information as a response to the UE context modification request message.

In addition, the eNB may receive the measurement report from the terminal to determine the cell of the target system (target RAT, for example, UTRAN or GERAN) to which the terminal moves. In addition, the eNB may include the context information of the terminal to be transmitted to the base station of the determined target system (target RAT) in the first container information (source to target container). The first container information may include the radio access related information on the terminal. In addition, in step S925, the terminal may transmit the first container information (source to target container) to the MME by including the first container information in the handover required message.

In step S930, the MME receiving the handover required message may transmit a forward relocation request message to a core network entity of the target system (target RAT), that is, the SGSN. The forward relocation request message may include all or part of the first container information (source to target container information) that the eNB transmits.

The SGSN receiving the forward relocation request message may identify that the terminal managed by the MME moves to the management area of the SGSN based on the specific information of the forward relocation request message. Therefore, in step S935, the SGSN may transmit the relocation request message to a base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S940, the base station (RNC) that successfully receives the relocation request message may transmit the relocation request ACK message to the SGSN to provide the response. The relocation request ACK message may include the second container information (target to source container information). The second container information (target to source container information) may include the radio access related information on the terminal to access the base station (RNC) of the target system (target RAT).

In step S945, the SGSN receiving the relocation request ACK may transmit the forward relocation response message including all or part of the second container information (target to source container) to the MME.

The MME may receive a forward relocation response message and identify that the target system (target RAT) is prepared for handover based on some information of the forward relocation response message. Accordingly, in step S950, the MME may transmit a handover command message including the second container information (target to source container information) to the first base station to handover the terminal.

If the RLF occurs before the terminal requesting the CSFB receives the response to the CSFB (handover command message from the base station), the terminal recognizing the occurrence of the RLF may perform the RRC re-establishment procedure with the second base station to recover the RRC connection.

Accordingly, in step S955, the terminal in which the RLF occurs may transmit the RRC re-establishment request message to the second base station to request an RRC connection recovery.

The second base station may identify the received RRC re-establishment request message to identify the first base station to which the terminal is connected before the RLF occurs.

In step S960, the second base station identifying the first base station may transmit the RLF indication message to the first base station to notify that the RLF occurs in the terminal.

The first base station receiving the RLF indication message may identify that the RLF has occurred in the terminal. Accordingly, in step S965, the first base station may transmit the handover request message to the second base station. In step S970, the second base station receiving a handover request message may transmit to the first base station a handover request ACK message as the response to the handover request message.

Through the inter-base station handover procedure, the first base station can transmit the UE context to the second base station.

In step S975, the second base station, which completes the inter-base station handover, may transmit the RRC re-establishment message to the terminal, such that the terminal may transmit the information for the access to the terminal.

In step S980, the terminal transmits an RRC re-establishment complete message to the second base station to complete the establishment of the RRC connection to the second base station.

The second base station becomes the serving base station of the terminal, and therefore in step S985, the second base station transmits a path switch request message to the MME to notify that the base station serving the corresponding terminal has changed to itself.

In step S990, the MME receiving the path change message transmits the modify bearer request message to the S-GW so as to notify the second base station information of a new serving terminal.

In step S991, the S-GW receiving the modify bearer request message may transmit to the MME the modify bearer response message as the response to the modify bearer request message.

When the modify bearer procedure is completed, in step S992, the MME may transmit the path switch request ACK message to the second base station to notify that the path switch request is completed.

The MME may identify the indicator (IMSI, GUTI) of the terminal included in the path switch request message received in step S985 to identify whether the terminal is performing the CSFB procedure. In addition, if it is determined that the terminal is performing the CSFB procedure, in step S992, the MME may transmit the CSFB indicator, which is an identifier indicating that the terminal is performing the CSFB procedure, by including the CSFB indicator in the path switch request ACK message which is the response message to the path switch request message.

In step S993, the second base station receiving the path switch ACK message may transmit the UE context release message to the first base station to notify that the UE context is released.

In addition, the second base station may resume the CSFB procedure for the terminal based on the CSFB indicator included in the path switch ACK message.

The second base station configures the first container information (source to target container) including the radio access information of the terminal connected to the second base station in step S994 to resume the CSFB procedure, and may transmit the handover required message for the CSFB to the MME. Next, the MME receiving the handover required message performs the CSFB procedure on the second base station.

That is, in the present embodiment, the MME is transmitted by being included the CSFB indicator in the path switch ACK message, such that the second base station may identify the state in which the terminal requests the CSFB or that the terminal is performing the CSFB procedure. Accordingly, after the path switch procedure with the MME is completed, the second base station may transmit the handover required message for moving the terminal to the target system to resume the CSFB procedure for the terminal. Therefore, even when the terminal is disconnected from the existing first base station, the terminal is connected to the system for providing the CS service through the second base station, and thus may seamlessly use the CS service.

The CSFB procedure after the MME receives the handover required message is similar to the above-described contents. However, the MME may omit the forward relocation procedure.

Specifically, if the MME stores the previously received second container information (target to source container), it is not necessary to receive the second container information by performing the forward relocation procedure again.

In addition, since the base station (RNC) of the target system receives the first container information (source to target container) through the MME in response to the CSFB request of the terminal, the base station knows the information on the terminal, and thus the forward relocation procedure need not be performed.

However, when the first container information or the second container information is changed, the forward relocation procedure may be performed to transmit the first container information to the RNC and receive the second container information from the RNC.

FIG. 10 is a diagram illustrating another method for receiving, by a terminal, a CS service according to an eighth embodiment of the present disclosure.

The present embodiment proposes a method in which the RLF occurs after the terminal requests the CSFB, and the terminal completes the RRC re-establishment procedure with the second base station and then the second base station receives the information of the target system (Target RAT) for receiving the CS service from the MME, and the second base station uses the information to transmit the handover command to the terminal to access the target system (target RAT) for the CS service so as to receive the CS service.

If the terminal initiates the CS service or receives the paging for the CS service, in step S1010, the terminal may transmit an extended service request message to the MME to initiate the CSFB procedure.

If the terminal notifies the MME to perform the CSFB procedure with the extended service request message, in step S1015, the MME may transmit the UE context modification request (S1AP UE context modification request) message to the eNB. The MME may transmit the CSFB indicator to the eNB by including the CSFB indicator in the UE context modification request message.

The eNB receiving the UE context modification request message may identify that the corresponding terminal needs to move to the system (for example, UTRAN or GERAN) for receiving the CS service based on the specific field or information of the received context modification request message. In the present disclosure, the system to which the terminal moves to receive the CS service may be referred to as the target system. In step S1020, the eNB may transmit to the MME the UE context modification response (S1AP UE context modification response) message including specific information as a response to the UE context modification request message.

In addition, the eNB may receive the measurement report from the terminal to determine the cell of the target system (target RAT, for example, UTRAN or GERAN) to which the terminal moves. In addition, the eNB may include the context information of the terminal to be transmitted to the base station of the determined target system (target RAT) in the first container information (source to target container). The first container information may include the radio access related information on the terminal. In addition, in step S1025, the terminal may transmit the first container information (source to target container) to the MME by including the first container information in a handover required message.

In step 1030, the MME receiving the handover required message may transmit the forward relocation request message to the core network entity of the target system (target RAT), that is, the SGSN. The forward relocation request message may include all or part of the first container information (source to target container information) that the eNB transmits.

The SGSN receiving the forward relocation request message may identify that the terminal managed by the MME moves to the management area of the SGSN based on the specific information of the forward relocation request message. Therefore, in step S1035, the SGSN may transmit the relocation request message to a base station (radio network controller, RNC) of the RAT to which the SGSN belongs to notify the RNC that the terminal accesses the RNC. The relocation request message may include all or part of the first container information (source to target container) that the eNB forwards and the base station (RNC) of the RAT providing the CS service may identify the specific field or information of the first container information (source to target container) to acquire the radio access related information on the terminal which is handed over to the base station.

In step S1040, the base station (RNC) that successfully receives the relocation request message may transmit the relocation request ACK message to the SGSN to provide the response. The relocation request ACK message may include the second container information (target to source container information). The second container information (target to source container information) may include the radio access related information on the terminal to access the base station (RNC) of the target system (target RAT).

In step S1045, the SGSN receiving the relocation request ACK may transmit the forward relocation response message including all or part of the second container information (target to source container) to the MME.

The MME may receive a forward relocation response message and identify that the target system (target RAT) is prepared for handover based on some information of the forward relocation response message. Accordingly, in step S1050, the MME may transmit a handover command message including the second container information (target to source container information) to the first base station to handover the terminal.

If the RLF occurs before the terminal requesting the CSFB receives the response to the CSFB (handover command message from the base station), the terminal recognizing the occurrence of the RLF may perform the RRC re-establishment procedure with the second base station to recover the RRC connection.

Accordingly, in step S1055, the terminal in which the RLF occurs may transmit the RRC re-establishment request message to the second base station to request an RRC connection recovery.

The second base station may identify the received RRC re-establishment request message to identify the first base station to which the terminal is connected before the RLF occurs.

In step S1060, the second base station identifying the first base station may transmit the RLF indication message to the first base station to notify that the RLF occurs in the terminal.

The first base station receiving the RLF indication message may identify that the RLF has occurred in the terminal. Accordingly, in step S1065, the first base station may transmit the handover request message to the second base station. In step S1070, the second base station receiving the handover request message may transmit to the first base station the handover request ACK message as the response to the handover request message.

Through the inter-base station handover procedure, the first base station can transmit the UE context to the second base station.

In step S1075, the second base station, which completes the inter-base station handover, may transmit the RRC re-establishment message to the terminal, such that the terminal may transmit the information for the access to the terminal.

In step S1080, the terminal transmits an RRC re-establishment complete message to the second base station to complete the establishment of the RRC connection to the second base station.

The second base station becomes the serving base station of the terminal, and therefore in step S1085, the second base station transmits the path switch request message to the MME to notify that the base station serving the corresponding terminal has changed to itself.

In step S1090, the MME receiving the path change message transmits the modify bearer request message to the S-GW so as to notify the second base station information of a new serving terminal.

In step S1091, the S-GW receiving the modify bearer request message may transmit to the MME the modify bearer response message as the response to the modify bearer request message.

When the modify bearer procedure is completed, in step S1092, the MME may transmit the path switch request ACK message to the second base station to notify that the path switch request is completed.

The MME may identify the indicator (IMSI, GUTI) of the terminal included in the path switch request message received in step S1085 to identify whether the terminal is performing the CSFB procedure. In addition, the MME performing the CSFB procedure may receive the second container information (target to source container) including the radio access information of the base station of the target system (target RAT) from the target system (target RAT) have. Accordingly, if the MME recognizes that the terminal is the CSFB terminal and stores the second container information (target to source container) received from the target system (Target RAT), in step S1092, the MME may transmit the second container information (target to source container) to the second base station by including the second container information in the path switch request ACK message which is the response message to the path switch request message. In addition, the path switch request message may include the CSFB indicator indicating that the terminal is performing a CSFB procedure.

In step S1093, the second base station receiving the path switch ACK message may transmit the UE context release message to the first base station to notify that the UE context is released.

In addition, in step S1094, the second base station may transmit to the terminal the handover command message including the radio access information of the base station of the target system included in the second container information in order to resume the CSFB procedure. The terminal may handed over to the target RAT according to the handover command message, and may request the CS service to use the voice call.

In the present embodiment, after the RRC re-establishment procedure is completed, the path switch procedure and the forward relocation request procedure of the MME may be omitted. The path switch procedure and the forward relocation request procedure of the MME are the process of acquiring the second container information for handing over the terminal to the target system. However, in the present embodiment, since the second container information is acquired from the MME, the above procedure can be omitted and the handover command message can be directly transmitted to the terminal.

Figure 11:
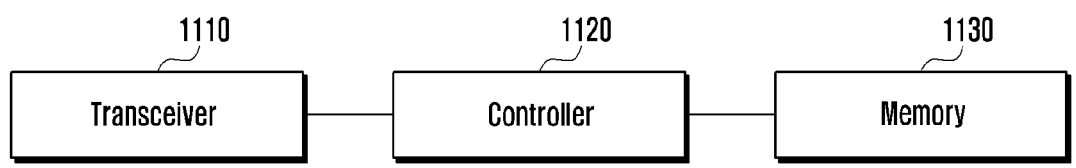
FIG. 11 is a diagram illustrating a configuration of terminal according to the present disclosure.

FIG. 11 is a diagram illustrating a configuration of terminal according to the present disclosure.

Referring to FIG. 11, the terminal may be configured to include a transceiver 1110, a controller 1120, and a storage unit 1130. For example, the controller may be defined as "circuit, application specific integrated circuit, or at least one processor".

The transceiver 1110 may perform communication with other network entities. The transceiver 1110 may transmit the message to the MME to request the CSFB and may receive the message for the radio resource connection with the second base station when RLF occurs.

The controller 1120 may control an operation of the terminal. The controller 1120 may transmit the extended service request message to the MME to request the CSFB.

In addition, the controller 1120 may detect the radio link failure (RLF) with the first base station. If the RLF occurs in the terminal, the controller may identify whether the CSFB procedure is being performed.

Specifically, the controller 1120 may include the control plane protocol controller and the RRC protocol controller, and the control plane protocol controller may determine whether the CSFB procedure is being performed and may transmit the determined result to the RRC protocol controller. In addition, the controller may store the indicator indicating that the terminal has requested the CSFB procedure, and may determine that the CSFB procedure is being performed.

The controller 1120 identifying that the CSFB procedure is being performed may attempt the connection to the target system for using the CS service without performing the RRC re-establishment procedure with the second base station. When connected to the target system, the terminal may receive the CS service by transmitting the CM service request message to the base station of the target system.

Alternatively, the controller 1120 identifying that the RLF occurs in the terminal may transmit the RRC re-establishment request message to perform the RRC re-establishment procedure with the second base station. The controller 1120 may receive the RRC re-establishment message, which is the response to the RRC re-establishment request message, and complete the RRC re-establishment procedure by transmitting the RRC re-establishment complete message.

At this time, the controller 1120 may transmit the CSFB indicator to the second base station by including the CSFB indicator in the RRC re-establishment request message or the RRC re-establishment complete message. Therefore, the second base station may identify that the terminal requests the CSFB or that the terminal is performing the CSFB procedure based on the received CSFB indicator.

The second base station may transmit the handover required message to the MME for handing over the terminal to the target system based on the CSFB indicator after the path switch procedure with the MME is completed.

The controller 1120 may receive the handover command message for handing over to the target system from the second base station. That is, the controller 1120 may transmit the CSFB indicator to the second base station and thus even if the terminal is disconnected from the existing first base station, hands over the terminal to the system providing the CS service through the second base station, such that the terminal can seamlessly use the CS service.

In addition, when the second base station receives the second container information (target to source container) from the MME, the controller 1120 may omit the path switch procedure and the forward relocation request procedure of the MME, and receive the handover command message from the second base station.

Meanwhile, the controller 1120 may receive the RRC re-establishment reject message in response to the RRC re-establishment request message. The controller 1120 receiving the RRC re-establishment reject message identifies that the RRC connection resumption has failed and identify that the CSFB is requested to attempt the connection to the base station of the target system that can use the CS service. In addition, the controller 1120 may perform the location update procedure with the base station of the target system.

In addition, the controller 1120 may transmit the measurement report message according to the measurement request message of the base station. The measurement report message may be used to determine the target system to which the terminal will move.

The storage unit 1130 may store the information necessary for the terminal to receive the CS service. The storage unit 1130 may store the CSFB indicator according to the CSFB request of the terminal. In addition, the storage unit 1130 may store the result of determining whether the control plane protocol controller of the controller 1120 is performing the CSFB procedure. In addition, the storage unit 1130 may store the measurement report of the controller 1120.

Figure 12:
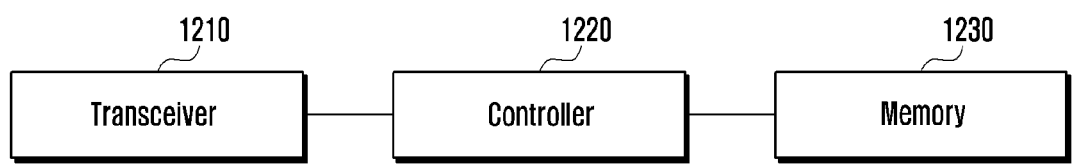
FIG. 12 is a diagram illustrating a configuration of a first base station according to the present disclosure.

FIG. 12 is a diagram illustrating a configuration of a first base station according to the present disclosure.

Referring to FIG. 12, the first base station may be configured to include a transceiver 1210, a controller 1220, and a storage unit 1230. For example, the controller may be defined as "circuit, application specific integrated circuit, or at least one processor".

The transceiver 1210 may perform communication with other network entities. The transceiver 1210 may transmit and receive to and from the MME the message for the handover of the terminal to the target system. In addition, when the RLF occurs in the connection to the terminal, the transceiver 1210 may transmit and receive to and from the second base station the message to handover of the terminal to the second base station.

The controller 1220 may receive the UE context modification request message from the MME to handover the terminal to the target system. The controller 1220 may identify that the terminal requests the CSFB based on the CSFB indicator included in the UE context modification request message. In addition, the controller 1220 may transmit the response message to the MME in response to the UE context modification request message.

In addition, the controller 1220 may determine the target system to which the terminal is to be moved using the measurement report received from the terminal, and transmit the UE context information to be transmitted to the base station of the target system to the MME by including the UE context information in the first container information (source to target container). The first container information may include the radio access related information on the terminal, and the controller may transmit the handover required message to the MME by including the handover required message in the first container information.

In addition, the controller 1220 may receive the handover command message for the handover of the terminal. The second container information (target to source container) may be included in the handover command message, and the second container information may include the radio access related information for the terminal to access the base station (RNC) of the target system (target RAT). Accordingly, the controller 1220 may transmit the handover command to the terminal to handover the terminal to the target system.

However, if the radio resource connection between the terminal and the first base station is disconnected before the controller 1220 controls the terminal to receive the handover command message, the controller 1220 may detect that the RLF occurs in the terminal. In addition, the controller 1220 may identify that the RLF occurs in the terminal based on the RLF indication message received from the second base station. Accordingly, the controller 1220 may transmit the handover request message to the second base station and receive the handover request ACK message which is the response to the handover request message. The controller 1220 may terminate the connection to the terminal by receiving the UE context release message from the second base station.

On the other hand, the controller 1220 confirming that the RLF occurs in the terminal may determine whether the terminal is performing the CSFB procedure and transmit the determined result to the second base station. The controller 1220 may identify that the terminal is performing the CSFB procedure based on the S1 UE context modification message or the handover command message that is received from the MME.

If the terminal is performing the CSFB procedure, the controller 1220 may transmit the CSFB indicator to the second base station by including the CSFB indicator in the handover request message. Accordingly, after completing the path switch procedure, the second base station may handover the terminal to the base station of the second system according to the CSFB indicator.

Alternatively, the controller 1220 may transmit information for rejecting the RRC re-establishment procedure by including the information in the handover request message. This is to allow the second base station to reject the RRC re-establishment procedure so as to directly handover the terminal to the target system.

Specifically, the controller 1220 may transmit the message not to perform handover by including the message in the handover request message. For example, the controller 1220 may transmit the UE context information without including the UE context information in the handover request message, or the controller 1220 may transmit to the second base station the information indicating that the context fetch operation is not performed by including the information in the handover request message. Alternatively, the controller 1220 may transmit the CSFB indicator to the second base station by including the CSFB indicator in the handover request message. Therefore, the second base station receiving the handover request message including the above information may reject the RRC re-establishment procedure, and the terminal may directly use the CS service by handing over to the target system.

Depending on the setting of the first base station, the controller 1220 may determine which information is transmitted by being included in the handover request message.

The storage unit 1230 may store the information for providing the CS service to the terminal. The storage unit 1230 may store the UE context information. In addition, the storage unit 1230 may store the first container information including the radio access related information on the terminal. In addition, the storage unit 1230 may store the CSFB indicator received from the MME. In addition, the storage unit 1230 may store the information to be included in the handover request message according to the CSFB procedure of the terminal. Also, the storage unit 1230 may store the second container information (target to source container) received from the MME.

Figure 13:
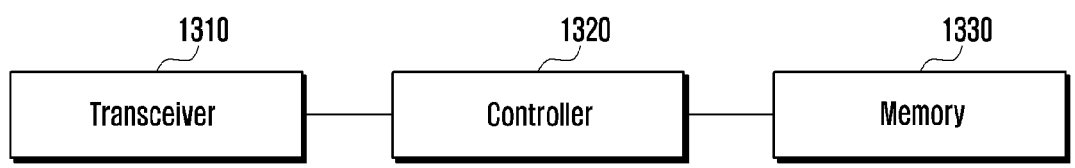
FIG. 13 is a diagram illustrating a configuration of a second base station according to the present disclosure.

FIG. 13 is a diagram illustrating a configuration of a second base station according to the present disclosure.

Referring to FIG. 13, the second base station may include a transceiver 1310, a controller 1320, and a storage unit 1330. For example, the controller may be defined as "circuit, application specific integrated circuit, or at least one processor".

The transceiver 1310 may perform communication with other network entities. If the RLF occurs in the terminal, the transceiver 1310 may transmit and receive the message for re-establishing the RRC connection to the terminal. In addition, the transceiver 1310 may transmit and receive a message for the handover of the terminal to a base station of another system.

The controller 1320 may receive the RRC re-establishment request message for re-establishing the RRC connection from the terminal in which the RLF occurs. The controller 1320 receiving the message may transmit the RLF indication message indicating that the RLF occurs in the terminal to the first base station. In addition, the controller 1320 may receive the handover request message from the first base station and transmit the handover request ACK message which is the response to the handover request message.

In addition, the controller 1320 may transmit the RRC re-establishment message to the terminal to re-establish the RRC connection, and receive the RRC connection re-establishment complete message which is the response to RRC re-establishment message to complete the RRC connection re-establishment. Alternatively, the controller 1320 may transmit the RRC re-establishment reject message to the terminal not to re-establish the RRC connection.

The controller 1320 completing the RRC connection re-establishment may transmit the path switch request message to the MME to notify that the base station serving the terminal has changed to the second base station. Also, the controller 1320 may receive the path switch request ACK message to identify that the path switch request is completed.

In addition, the controller 1320 may release the UE context of the first base station by transmitting the UE context release message to the first base station.

Meanwhile, the controller 1320 may identify that the terminal is performing the CSFB procedure based on the CSFB indicator included in the RRC re-establishment request message received from the terminal. Alternatively, the controller 1320 may identify that the terminal is performing the CSFB procedure based on the CSFB indicator included in the RRC re-establishment complete message received from the terminal. Alternatively, the controller 1320 may identify that the terminal is performing the CSFB procedure based on the CSFB indicator included in the handover request message received from the first base station. Alternatively, the controller 1320 may identify that the terminal is performing the CSFB procedure based on the CSFB indicator included in the path switch request ACK message received from the MME.

The controller 1320 identifying that the CSFB procedure is being performed based on any one of the messages may configure the first container information (source to target container) including the radio access information of the terminal and transmit the handover required message for the CSFB to the MME. The subsequent steps are similar to those described above. The controller 1320 may receive the second container information (target to source container) from the MME and transmit the handover command message to the terminal to control the terminal to handover to the target system. Accordingly, the controller 1320 can control the terminal to be connected to the system providing the CS service even when the terminal is disconnected from the first base station.

Meanwhile, the controller 1320 may transmit to the terminal the RRC re-establishment reject message, which rejects the RRC connection, using the information included in the handover request message received from the first base station. The controller 1320 may transmit the RRC re-establishment reject message to the terminal if the UE context information is not included in the handover request message or the information indicating that the UE context fetch is not performed is included in the handover request message. Alternatively, if the CSFB indicator is included in the handover request message, the controller 1320 may transmit the RRC re-establishment reject message to the terminal. The terminal receiving the RRC re-establishment reject message may directly access the base station of the target system to use the CS service.

If the CSFB indicator is included in the handover request message, the RRC re-establishment is completed, and it may be determined depending on the setting of the second base station whether the terminal is handed over to the base station of the second system or the terminal is directly connected to the second system by transmitting the RRC re-establishment reject message.

Meanwhile, if the received information includes the second container information, the controller 1320 may omit the path switch procedure and transmit the handover command message to the terminal.

The controller 1320 may receive the second container information through the handover request message received from the first base station or the handover request message received from the MME. The path switch procedure and the forward relocation request procedure of the MME are the process of acquiring the second container information for handing over the terminal to the target system. However, since the controller 1320 acquires the second container information from the first base station or the MME, the above procedure can be omitted and the handover command message can be directly transmitted to the terminal.

The storage unit 1330 may store the information for providing the CS service to the terminal. The storage unit 1330 may store the CSFB indicator received from the terminal, the first base station, or the MME. Also, the storage unit 1330 may store the first container information (source to target) included in the handover required message transmitted to the MME. Also, the storage unit 1330 may store the received second container information (target to source container) when receiving the second container information (target to source container) from the first base station or the MME.

Figure 14:
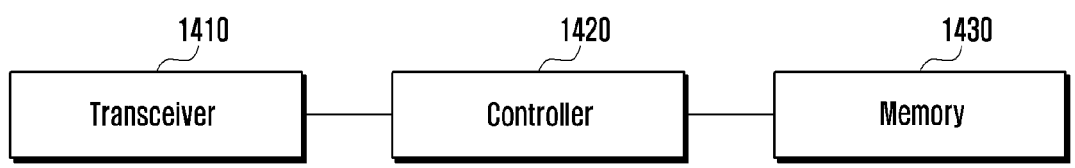
FIG. 14 is a diagram illustrating a configuration of MME according to the present disclosure.

FIG. 14 is a diagram illustrating a configuration of MME according to the present disclosure.

Referring to FIG. 14, the MME may include a transceiver 1410, a controller 1420, and a storage unit 1430. For example, the controller may be defined as "circuit, application specific integrated circuit, or at least one processor".

The transceiver 1410 may perform communication with other network entities. The transceiver 1410 may perform communication with the first base station or the second base station to handover the terminal to the target system.

The controller 1420 may control an operation of the MME. The controller 1420 may transmit the UE context modification request message to the first base station when receiving the extended service request message for requesting the CSFB from the terminal. In this case, the controller 1420 may transmit the UE context modification request message including the CSFB indicator to inform the first base station that the CSFB is requested. In addition, the controller 1420 may receive the UE context modification response message which is the response to the UE context modification request message. In addition, the controller 1420 may receive the handover required message including the first container information (source to target container) including the radio access related information on the terminal.

The controller 1420 may transmit the forward relocation request message including the first container information (source to target container) to the SGSN and receive the forward relocation response message including the second container information (target to source container). Accordingly, the controller 1420 may transmit the handover command message including the second container information (target to source container) to the base station, and the base station may perform the handover by transmitting the handover command message to the terminal.

However, if the RLF occurs in the terminal, the terminal re-establishes the RRC connection with the second base station, and the controller 1420 may receive the path switch request message from the second base station. Accordingly, the controller 1420 may transmit the bearer modification request message to the SGW and receive the bearer modification response message which is the response to the bearer modification request message, in order to modify the bearer. The controller 1420 may transmit the path switch ACK message to the second base station.

In this case, the controller 1420 may transmit to the second base station the CSFB indicator indicating that the terminal requests the CSFB procedure or that the terminal is performing the CSFB procedure by including the CSFB indicator in the path switch ACK message. Accordingly, after the path switch procedure with the MME is completed, the second base station may transmit the handover required message for moving the terminal to the target system to resume the CSFB procedure for the terminal.

Alternatively, the controller 1420 may transmit the second container information (target to source container) by including the second container information in the path switch ACK message. Accordingly, the second base station may transmit the handover command message to the terminal using the second container information to handover the terminal to the target system.

The storage unit 1430 may store the information for providing the CS service to the terminal. The storage unit 1430 may store the second container information received from the SGSN. In addition, the storage unit 1430 may store the CSFB indicator received from the terminal.

Meanwhile, although the exemplary embodiments of the present disclosure have been illustrated in the present specification and the accompanying drawings and specific terms have been used, they are used in a general meaning in order to assist in the understanding the present disclosure and do not limit the scope of the present disclosure. It is obvious to those skilled in the art to which the present disclosure pertains that various modifications may be made without departing from the scope of the present disclosure, in addition to the exemplary embodiments disclosed herein.

The invention claimed is:

1. A method performed by a terminal for receiving a circuit switching (CS) service, the method comprising:

transmitting, to a mobility management entity (MME), a CS fallback (CSFB) request through a first base station to use the CS service;
detecting a failure of a radio resource connection to the first base station; and
transmitting, to a second base station, a radio resource control (RRC) re-establishment request message including a CSFB indicator indicating that a CSFB is requested,
wherein information associated with the CSFB is set to a predetermined value in case that the CSFB being requested, and
wherein the CSFB indicator is included in the RRC re-establishment request message based on the information.

2. The method of claim 1, further comprising receiving from the second base station, an RRC re-establishment message.

3. The method of claim 1, wherein the information is valid while a timer is running.

4. A method performed by a mobility management entity (MME) for providing a circuit switching (CS) service, the method comprising:
receiving a CS fallback (CSFB) request through a first base station to use the CS service transmitted from a terminal;
receiving, from a second base station, a path switch request message based on a failure of a radio resource connection between the first base station and the terminal; and
transmitting to the second base station, a path switch ACK message including container information associated with a base station supporting the CS service and a CSFB indicator indicating that a CSFB is requested, the container information being used for handing over the terminal to the based station.

5. The method of claim 4, wherein the path switch request message includes an identifier of the terminal, and
wherein the identifier is used to include the CSFB indicator in the path switch ACK message.

6. The method of claim 5, wherein the identifier includes at least one of an international mobile subscriber identity, IMSI, or a globally unique temporary identifier, GUTI.

7. A terminal for receiving a circuit switching (CS) service, the terminal comprising:
a transceiver; and
a controller configured to;
transmit, via the transceiver, a CS fallback (CSFB) request to a mobility management entity (MME) through a first base station to use the CS service,
detect a failure of a radio resource connection to the first base station, and
transmit, via the transceiver, to a second base station, a radio resource control (RRC) re-establishment request message including a CSFB indicator indicating that a CSFB is requested,
wherein information associated with the CSFB is set to a predetermined value in case that the CSFB being requested, and
wherein the CSFB indicator is included in the RRC re-establishment request message based on the information.

8. The terminal of claim 7, wherein the controller is further configured to receive, from the second base station, an RRC re-establishment message.

9. The terminal of claim 7, wherein the information is valid during a timer is running.

10. A mobility management entity (MME) for providing a circuit switching (CS) service, the MME comprising:
a transceiver; and
a controller configured to:
receive, via the transceiver, a CS fallback (CSFB) request through a first base station to use the CS service transmitted from a terminal,
receive, via the transceiver from a second base station, a path switch request message based on a failure of a radio resource connection between the first base station and the terminal, and
transmit, via the transceiver to the second base station, a path switch ACK message including container information associated with a base station supporting the CS service and a CSFB indicator indicating that a CSFB is requested, the container information being used for handing over the terminal to the base station.

11. The MME of claim 10, wherein the path switch request message includes an identifier of the terminal,
wherein the identifier is used to include the CSFB indicator in the path switch ACK message, and
wherein the identifier includes at least one of an international mobile subscriber identity, IMSI, or a globally unique temporary identifier, GUTI.

12. A method for providing a circuit switching (CS) service of a second base station, the method comprising:
receiving, from a terminal, a radio resource control (RRC) re-establishment request message including a CS fallback (CSFB) indicator indicating that a CSFB is requested based on a failure of a radio resource connection between a first base station and the terminal;
transmitting, to the first base station, an indicator of the failure of the radio resource connection;
receiving, from the first base station, a handover request message; and
transmitting an RRC re-establishment message in response to the RRC re-establishment request message,
wherein the CSFB indicator is included in the RRC re-establishment request message based on information associated with the CSFB that is set to a predetermined value in case that the CSFB is requested.

13. The method of claim 12, wherein the information is valid while a timer is running.

14. A second base station for providing a circuit switching (CS) service, the second base station comprising:
a transceiver; and
a controller configured to,
receive, from a terminal, a radio resource control (RRC) re-establishment request message including a CS fallback (CSFB) indicator indicating that a CSFB is requested based on a failure of a radio resource connection between a first base station and the terminal,
transmit, to the first base station, an indicator of the failure of the radio resource connection,
receive, from the first base station, a handover request message, and
transmit an RRC re-establishment message in response to the RRC re-establishment request message,
wherein the CSFB indicator is included in the RRC re-establishment request message based on information associated with the CSFB that is set to predetermined value in case that the CSFB is requested.

15. The second base station of claim 14, wherein the information is valid while a timer is running.

* * * * *